US011449808B2

(12) United States Patent
Hara et al.

(10) Patent No.: US 11,449,808 B2
(45) Date of Patent: Sep. 20, 2022

(54) INFORMATION PROCESSING APPARATUS, INFORMATION PROCESSING SYSTEM, STORAGE MEDIUM, AND INFORMATION PROCESSING METHOD

(71) Applicant: TOYOTA JIDOSHA KABUSHIKI KAISHA, Toyota (JP)

(72) Inventors: Yusuke Hara, Musashino (JP); Shuhei Aketa, Koto-ku (JP); Toru Yanagida, Nagoya (JP); Shin Sakurada, Toyota (JP); Tae Sugimura, Miyoshi (JP); Yasutaka Ujihara, Meguro-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 65 days.

(21) Appl. No.: 16/935,711

(22) Filed: Jul. 22, 2020

(65) Prior Publication Data
US 2021/0027213 A1 Jan. 28, 2021

(30) Foreign Application Priority Data
Jul. 22, 2019 (JP) .............................. JP2019-134663

(51) Int. Cl.
*G06Q 10/02* (2012.01)
*G06Q 50/30* (2012.01)
*G06F 21/31* (2013.01)
*G01C 21/34* (2006.01)

(52) U.S. Cl.
CPC ......... *G06Q 10/02* (2013.01); *G01C 21/3407* (2013.01); *G06F 21/31* (2013.01); *G06Q 50/30* (2013.01)

(58) Field of Classification Search
CPC .... G06Q 10/02; G06Q 50/30; G01C 21/3407; G06F 21/31
See application file for complete search history.

(56) References Cited

U.S. PATENT DOCUMENTS

| 10,295,363 | B1 * | 5/2019 | Konrardy | G05D 1/0287 |
| 2014/0330608 | A1 * | 11/2014 | Arthur | F02N 11/003 |
| | | | | 705/7.19 |
| 2015/0278714 | A1 * | 10/2015 | Collins | G06Q 10/02 |
| | | | | 705/5 |
| 2018/0211228 | A1 * | 7/2018 | Narayan | H04L 67/16 |
| 2019/0265054 | A1 * | 8/2019 | Laplante | G01C 21/3438 |

FOREIGN PATENT DOCUMENTS

| JP | 2002312603 A | * | 10/2002 | G06Q 50/00 |
| JP | 6338310 B1 | | 6/2018 | |

* cited by examiner

*Primary Examiner* — Jeff Zimmerman
*Assistant Examiner* — Tayar M Kyu
(74) *Attorney, Agent, or Firm* — Oliff PLC

(57) ABSTRACT

An information processing apparatus includes a controller. The controller performs control to store service specifications received from a first terminal apparatus in association with a child-care facility corresponding to the first terminal apparatus. The controller performs control to store a child-care request received from a second terminal apparatus. The controller generates a pick-up route. The pick-up route is for navigating a vehicle to travel via a pick-up location of the child-care request within a pick-up time slot and reach a facility location at or after the child-care start time of the child-care facility. The controller sends, to a third terminal apparatus installed in a vehicle, the pick-up route.

12 Claims, 15 Drawing Sheets

INFORMATION PROCESSING APPARATUS, INFORMATION PROCESSING SYSTEM, STORAGE MEDIUM, AND INFORMATION PROCESSING METHOD

CROSS-REFERENCE TO RELATED APPLICATION

The present application claims priority to Japanese Patent Application No. 2019-134663 filed on Jul. 22, 2019, the entire disclosure of which is incorporated herein by reference.

TECHNICAL FIELD

The present disclosure relates to an information processing apparatus, an information processing system, a storage medium, and an information processing method.

BACKGROUND

Nurseries and other child-care centers, which take care children while their parents are at work, generally would not admit a sick child. In this case, temporary child-care facilities such as sick-child-care centers may attend a sick child. When a user desires to use such temporary child-care facilities, the user needs to check individual temporary child-care facilities, select a temporary child-care facility, and make a reservation by, for example, phone before the user actually visits the facility. However, even if a temporary child-care facility is found, the facility does not always accept the user's child because the facility has an upper limit on the number of children who can be taken care of at the facility. Thus, the user who desires to use temporary child-care facilities needs to continue searching until the user finds an available temporary child-care facility which would accept and take care of the user's child.

With the aim of improving the convenience for both users and facility management, a child-care facility reservation system for searching for and also reserving a temporary child-care facility has been developed (refer to PTL 1).

CITATION LIST

Patent Literature

PTL 1: JP6338310B1

SUMMARY

In the child-care facility reservation system described in PTL 1, facility features, such as opening hours, of a plurality of sick-child-care centers are presented for users and the user can reserve a sick-child-care center out of the presented sick-child-care centers. Yet, as in cases such as when the user cannot reserve a neighboring sick-child-care center and when the time for which the user desires to use a sick-child-care center does not match the opening hours of the sick-child-care center, the user cannot always reserve a desired temporary child-care facility due to time and place constraints.

In consideration of the circumstances described above, an object of the present disclosure is to enhance the usability of child-care facilities at which children are temporarily taken care of, regardless of time and place constraints.

An information processing apparatus according to an embodiment of the present disclosure includes a controller configured to perform control to store service specifications containing a facility location and a child-care start time, the service specifications being received from a first terminal apparatus, in association with a child care facility corresponding to the first terminal apparatus, perform control to store a child-care request containing a pick-up location of a child and a pick-up time slot of the child, the child-care request being received from a second terminal apparatus, generates a pick-up route for navigating a vehicle to travel via the pick-up location of the child-care request within the pick-up time slot and reach the facility location at or after the child-care start time of the child-care facility, and perform control to send, to a third terminal apparatus installed in the vehicle, the pick-up route.

An information processing system according to an embodiment of the present disclosure includes an information processing apparatus having a controller configured to perform control to store service specifications containing a facility location and a child-care start time, the service specifications being received from a first terminal apparatus, in association with a child-care facility corresponding to the first terminal apparatus, perform control to store a child-care request containing a pick-up location of a child and a pick-up time slot of the child, the child-care request being received from a second terminal apparatus, generate a pick-up route for navigating a vehicle to travel via the pick-up location of the child-care request within the pick-up time slot and reach the facility location at or after the child-care start time of the child-care facility, and perform control to send, to a third terminal apparatus installed in the vehicle, the pick-up route. The information processing system also includes the first terminal apparatus configured to send the service specifications to the information processing apparatus, the second terminal apparatus configured to send the child-care request to the information processing apparatus, and the third terminal apparatus configured to receive the pick-up route from the information processing apparatus.

A non-transitory computer-readable storage medium according to an embodiment of the present disclosure stores a program causing an information processing apparatus to execute a process. The process includes receiving service specifications containing a facility location and a child-care start time from a first terminal apparatus, storing the service specifications in association with a child-care facility corresponding to the first terminal apparatus, receiving a child-care request containing a pick-up location of a child and a pick-up time slot of the child from a second terminal apparatus, storing the child-care request, generating a pick-up route for navigating a vehicle to travel via the pick-up location of the child-care request within the pick-up time slot and reach the facility location at or after the child-care start time of the child-care facility, and sending to a third terminal apparatus the pick-up route.

An information processing method according to an embodiment of the present disclosure, the information processing method being implemented by an information processing apparatus, includes receiving service specifications containing a facility location and a child-care start time from a first terminal apparatus, storing the service specifications in association with a child-care facility corresponding to the first terminal apparatus, receiving a child-care request containing a pick-up location of a child and a pick-up time slot of the child from a second terminal apparatus, storing the child-care request, generating a pick-up route for navigating a vehicle to travel via the pick-up location of the child-care request within the pick-up time slot and reach the facility location at or after the child-care start time of the child-care facility, and sending to a third terminal apparatus the pick-up route.

The information processing apparatus, the information processing system, the storage medium, and the information processing method according to an embodiment of the present disclosure can improve the usability of child-care facilities.

DETAILED DESCRIPTION

Hereinafter, an embodiment of the present disclosure will be described with reference to the drawings.

Figure 1:
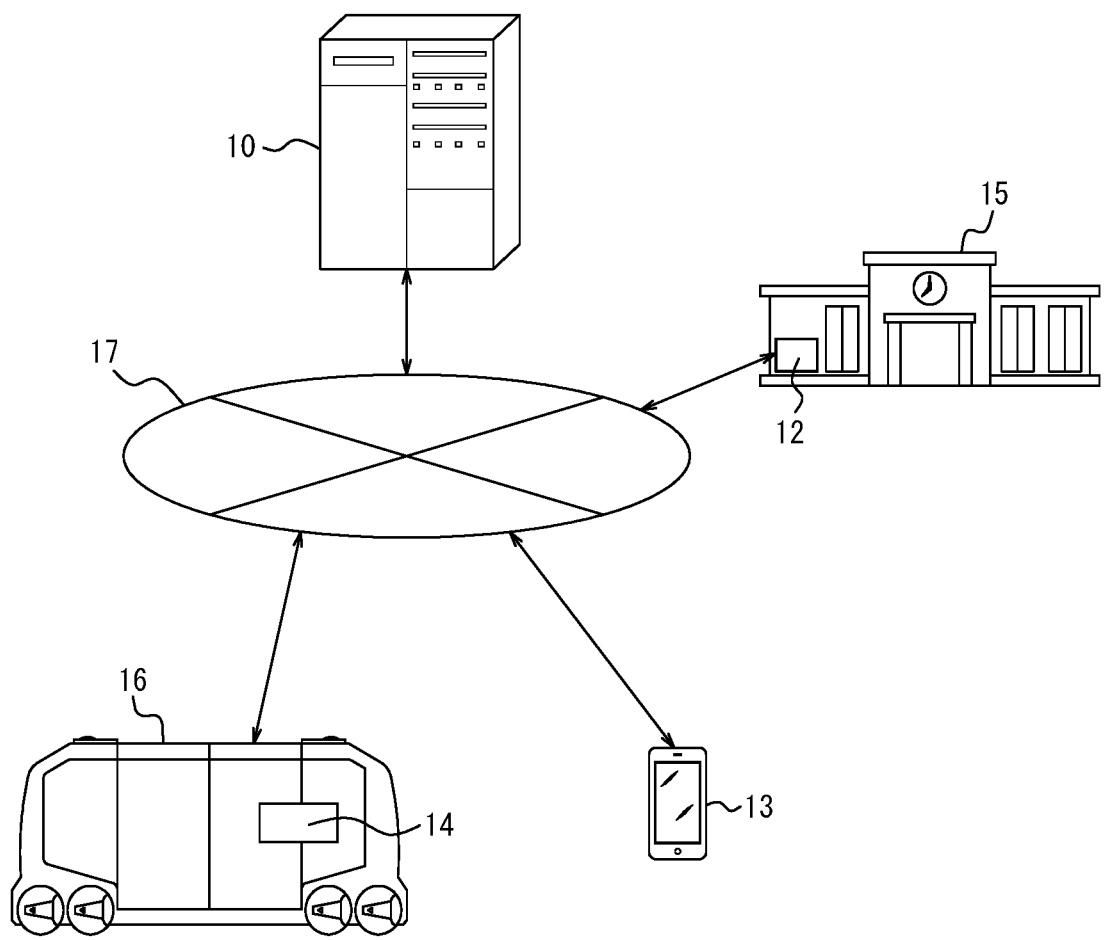
FIG. 1 is a configuration diagram illustrating an overall configuration of an information processing system including an information processing apparatus according to an embodiment of the present disclosure.

An information processing system including an information processing apparatus 10 according to an embodiment of the present disclosure will be outlined with reference to FIG. 1. The information processing system includes a first terminal apparatus 12, a second terminal apparatus 13, a third terminal apparatus 14, and the information processing apparatus 10.

The first terminal apparatus 12 is, for example, a general electronic device such as a smartphone or a personal computer (PC), but the first terminal apparatus 12 is not limited to this example and may be an electronic device especially for the information processing system. The first terminal apparatus 12 is provided for a temporary child-care facility (a child-care facility) 15 that can temporarily accept children including sick children. The second terminal apparatus 13 is, for example, a general electronic device such as a smartphone or a PC, but the second terminal apparatus 13 is not limited to this example and may be an electronic device especially for the information processing system. The second terminal apparatus 13 is owned by, for example, a parent who has a child. The third terminal apparatus 14 is an electronic device especially for the information processing system but may be, for example, a general electronic device such as a PC. The third terminal apparatus 14 is installed in a vehicle 16. The information processing apparatus 10 includes one server apparatus or a plurality of server apparatuses that are capable of communicating with each other. While FIG. 1 illustrates one first terminal apparatus 12, one second terminal apparatus 13, and one third terminal apparatus 14 for ease of description, the information processing system only has to include at least one first terminal apparatus 12, at least one second terminal apparatus 13, and at least one third terminal apparatus 14.

The first terminal apparatus 12, the second terminal apparatus 13, the third terminal apparatus 14, and the information processing apparatus 10 are communicably connected to a network 17 involving, for example, a mobile communication network and the Internet. At least part of the information processing system is used for providing a mobility service (Mobility-as-a-Service: MaaS). Service providers can provide mobility services such as a ridesharing service, a mobile hotel, and a mobile retail shop by using the third terminal apparatus 14 and the vehicle 16.

The outline of the information processing system according to the present embodiment is hereinafter further explained. The temporary child-care facility 15 can be registered in the information processing apparatus 10 by using the first terminal apparatus 12 that is owned by the temporary child-care facility 15. In the registration, the first terminal apparatus 12 sends service specifications containing the facility location and the child-care start time of the temporary child-care facility 15 to the information processing apparatus 10. It should be noted that, as used herein, "contain" denotes containing information on a target such as a facility location. As used herein, "send" denotes sending information on a target such as service specifications. The information processing apparatus 10 stores the service specifications in association with the temporary child-care facility 15 corresponding to the first terminal apparatus 12 that sends the service specifications. A child-care request is input to the second terminal apparatus 13 by a user who needs temporary child-care. When the second terminal apparatus 13 detects the input of the child-care request, the second terminal apparatus 13 sends the child-care request containing a pick-up location and a pick-up time slot to the information processing apparatus 10. When the information processing apparatus 10 receives the child-care request, the information processing apparatus 10 sends to the second terminal apparatus 13 a determination result indicating whether the vehicle 16 can pick up a child and whether the temporary child-care facility 15 can take care of the child. The information processing apparatus 10 generates a pick-up route for navigating a vehicle to travel via pick-up locations of individual child-care requests within corresponding pick-up time slots and reach the facility location at or after the corresponding child-care start time of individual temporary child-care facility 15. It should be noted that, as used herein, "generate" denotes generating information on a target such as a pick-up route. The information processing apparatus 10 sends the pick-up route to the third terminal apparatus 14. It should be noted that, as used herein, "send" denotes sending information on a target such as a pick-up route.

As a result, in the present embodiment, by using the vehicle 16 equipped with the third terminal apparatus 14 for picking up children, the travel time of the vehicle 16 can be used for adjustment, and thus, it is possible to ease constraints regarding place and time with respect to matching between a user and the temporary child-care facility 15. Consequently, the opportunity of matching between a user and the temporary child-care facility 15 is increased and the usability of the temporary child-care facility 15 is thus improved.

Next, the constituents of the information processing system are described in detail.

Figure 2:
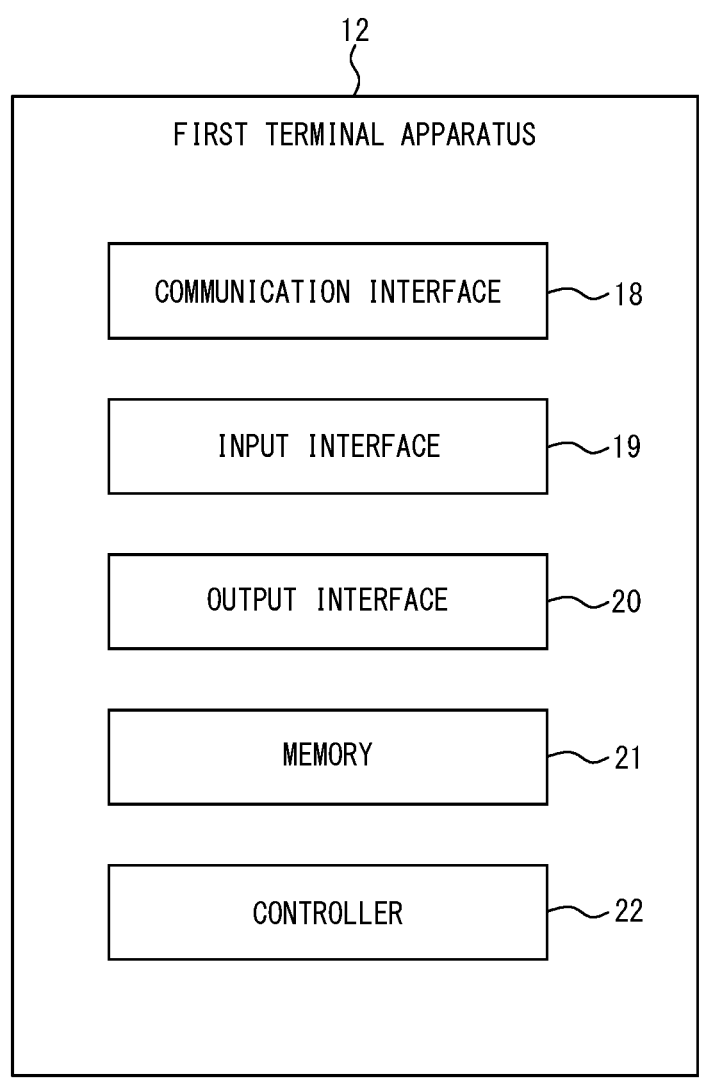
FIG. 2 is a functional block diagram schematically illustrating a configuration of a first terminal apparatus of FIG. 1.

As illustrated in FIG. 2, the first terminal apparatus 12 includes a communication interface 18, an input interface 19, an output interface 20, a memory 21, and a controller 22.

The communication interface 18 includes a communication module that establishes communication via a dedicated line. The communication interface 18 also includes a communication module that establishes connection with the network 17. For example, the communication interface 18 may include a communication module compliant with mobile communication standards such as the fourth generation (4G) and the fifth generation (5G). In the present embodiment, the first terminal apparatus 12 is connected to the network 17 via the communication interface 18. The communication interface 18 sends and receives various kinds of information via the network 17.

The input interface 19 includes at least one interface that detects user inputs. For example, the input interface 19 is, but not limited to, physical keys, capacitive keys, a touch screen provided in combination with a display of the output interface 20, or a microphone that accepts voice input.

The output interface 20 includes at least one interface that outputs information to notify a user. For example, the output interface 20 is, but not limited to, a display that outputs information as an image or a speaker that outputs information in sound.

The memory 21 is, but not limited to, a semi-conductor memory, a magnetic memory, an optical memory, or the like. The memory 21 may function as, for example, a primary storage, an auxiliary storage, or a cache memory. The memory 21 stores any information that is used for an operation use the first terminal apparatus 12. The information stored in the memory 21 may be updated by using, for example, information received from the network 17 via the communication interface 18.

The memory 21 may store, for example, a system program and an application program. The memory 21 may store a child-care schedule and identification information on the first terminal apparatus 12. The child-care schedule is, for example, a child-care plan in the temporary child-care facility 15 that contains a user name, a name of a child who is taken care of, and a child-care time on a daily basis. The child-care time includes arrival and departure times at and from the temporary child-care facility 15. The identification information on the first terminal apparatus 12 is information that can be used for uniquely identifying the first terminal apparatus 12 in the information processing system.

The controller 22 includes at least one processor. In the present embodiment, a "processor" is, but not limited to, a general processor or a processor especially for a particular processing operation. The controller 22 controls the entire operation of the first terminal apparatus 12.

When the input interface 19 detects a user input for requesting registration of the temporary child-care facility 15, the controller 22 causes the output interface 20 to output a request for inputs of required details for registration. The required details contain, for example, a name of the temporary child-care facility 15, a facility location, a child-care start time, a child-care end time, holidays, and a capacity. The capacity can be the number of children obtained by subtracting a number of children of particular fixed places for which the temporary child-care facility 15 accepts child-care reservations by their own from the total capacity of the temporary child-care facility 15. The capacity may be divided under a quarantine room and a general room. When the input interface 19 detects a user input of the required details, the controller 22 generates service specifications including identification information on the first terminal apparatus 12 and the required details. The controller 22 controls the communication interface 18 to send the generated service specifications to the information processing apparatus 10.

The controller 22 manages the child-care schedule.

As described above, the first terminal apparatus 12 can accept child-care reservations by their own without using the information processing system. When a user input of reservation is detected, the controller 22 determines, in accordance with a child-care schedule stored in the memory 21, whether a fixed place is available during a child-care time on a date that are desired in the reservation. When there is an available place, the controller 22 causes the output interface 20 to output a request for an input such as a user name, a child's name, a child-care time, description of illness. When the input interface 19 detects a user input such as a user name, a child's name, a child-care time, and description of illness, the controller 22 stores in the memory 21 the user name, the child's name, the child-care time, and the description of illness, and the like. It should be noted that, as used herein, "store" denotes storing information on a target such as a user name.

When a confirmed child-care reservation of the following day, which will be described later, is received from the information processing apparatus 10, the controller 22 stores in the memory 21 a user name, a child's name, a child-care time, and description of illness contained in the confirmed child-care reservation of the following day in a manner in which the user name, the child's name, the child-care time, and the description of illness are included in a child-care schedule. As used herein, "receive" denotes receiving information on a target such as a confirmed child-care reservation. When the input interface 19 detects a user input for requesting display of a child-care schedule, the controller 22 causes the output interface 20 to output the child-care schedule stored in the memory 21.

Figure 3:
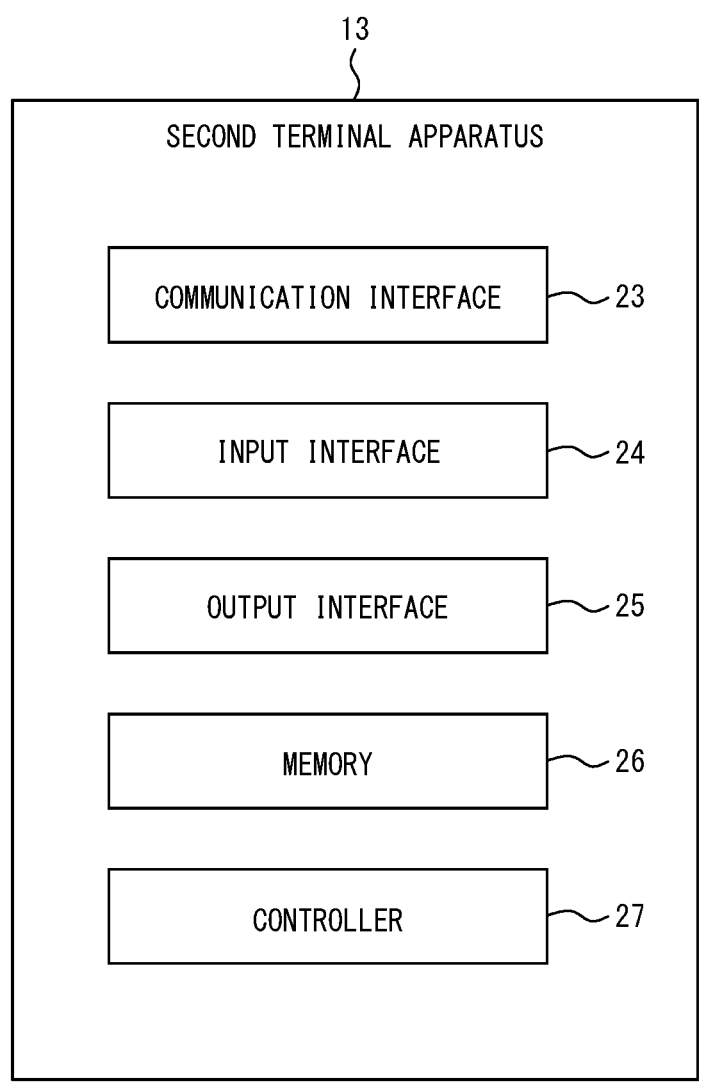
FIG. 3 is a functional block diagram schematically illustrating a configuration of a second terminal apparatus of FIG. 1.

As illustrated in FIG. 3, the second terminal apparatus 13 includes a communication interface 23, an input interface 24, an output interface 25, a memory 26, and a controller 27.

The communication interface 23 includes a communication module that establishes communication via a dedicated line. The communication interface 23 also includes a communication module that establishes connection with the network 17. For example, the communication interface 23 may include a communication module compliant with mobile communication standards such as the fourth generation (4G) and the fifth generation (5G). In the present embodiment, the second terminal apparatus 13 is connected to the network 17 via the communication interface 23. The communication interface 23 sends and receives various kinds of information via the network 17.

The input interface 24 includes at least one interface that detects user inputs. For example, the input interface 24 is, but not limited to, physical keys, capacitive keys, a touch screen provided in combination with a display of the output interface 20, or a microphone that accepts sound input.

The output interface 25 includes at least one interface that outputs information to notify a user. For example, the output interface 25 is, but not limited to, a display that outputs information as an image or a speaker that outputs information in sound.

The memory 26 is, but not limited to, a semiconductor memory, a magnetic memory, an optical memory, or the like. The memory 26 may function as, for example, a primary storage, an auxiliary storage, or a cache memory. The memory 26 stores any information that is used for an operation of the second terminal apparatus 13. The memory 26 may store, for example, a system program and an application program. The memory 26 may store identification information on the second terminal apparatus 13. The identification information on the second terminal apparatus 13 is information that can be used for uniquely identifying the second terminal apparatus 13 in the information processing system. The information stored in the memory 26 may be updated by using, for example, information received from the network 17 via the communication interface 23.

The controller 27 includes at least one processor. In the present embodiment, a "processor" is, but not limited to, a general processor or a processor especially for a particular processing operation. The controller 27 controls the entire operation of the second terminal apparatus 13.

When the input interface 24 detects a user input for requesting child-care, the controller 27 causes the output interface 25 to output a request for inputs of required details for requesting child-care. The required details contain information on, for example, the pick-up location, the drop-off location, the pick-up time slot, the drop-off time slot, the user name, the name, the date of birth, the age, the medical history, the ongoing medication, the allergies, and the vaccination history of the child to be taken care of. The pick-up location is a location at which the user hands the child to the vehicle 16. The pick-up location is input by inputting an address or selecting a point on a map. The drop-off location is a location at which the child is handed to the user from the vehicle 16. The drop-off location is input by entering an address or selecting a point on a map. The pick-up time slot is a time slot during which a user can hand over his/her child at a pick-up location. The drop-off time slot is a time slot during which a user can meet his/her child at a drop-off location. When the input interface 24 detects a user input of the required details, the controller 27 generates a child-care request including identification information on the second terminal apparatus 13 and the required details. The controller 22 sends the generated child-care request to the information processing apparatus 10 via the communication interface 23.

When a child-care availability condition described later is received from the information processing apparatus 10, the controller 27 causes the output interface 25 to output the child-care availability condition. The child-care availability condition indicates, for example, that a child-care service matching the desired specifics is available or unavailable.

When a confirmation report described later is received from the information processing apparatus 10, the controller 27 causes the output interface 25 to output the confirmation report. The confirmation report contains, for example, the temporary child-care facility 15 that is assigned as a facility to provide child-care, and contact information, a pick-up time, a drop-off time, and authentication information on the temporary child-care facility 15. The pick-up time is a time at which the vehicle 16 is expected to arrive at a pick-up location of desired specifics for child-care and may be a particular time slot of a short time, for example, five minutes, within a pick-up time slot. The drop-off time is a time at which the vehicle 16 is expected to arrive at a drop-off location of desired specifics for child-care and may be a particular time slot of a short time, for example, five minutes, within a drop-off time slot. The authentication information may be information that can be converted into a viewable sign or sound or may be digital data that cannot be converted into any form. The authentication information is used when a child is picked up or dropped off by the vehicle 16 during the transportation using the vehicle 16 as described later.

When the input interface 24 detects a user input for transferring authentication information contained in the received confirmation report to another second terminal apparatus 13, the controller 27 controls the communication interface 23 to send a transfer request containing identification information on the second terminal apparatus 13 as a transfer destination to the information processing apparatus 10.

The third terminal apparatus 14 is installed in the vehicle 16 as described above. For example, the vehicle 16 is, but not limited to, an autonomous driving vehicle that can perform automated driving or vehicle-following driving; the vehicle 16 may be any vehicle in which the third terminal apparatus 14 can be installed. The vehicle 16 may be, for example, a vehicle in which many people can sit, such as a bus. The vehicle 16 may have a separated quarantine space.

The outline of the third terminal apparatus 14 is that the third terminal apparatus 14 automatically generates control information by using automatic driving control software and sends the control information to the vehicle 16. The vehicle 16 performs vehicle control in accordance with the received control information. For example, the vehicle control is, but not limited to, automated driving control. At least part of an application programming interface (API) in which specifications of control information are defined is disclosed for service providers. Service providers can freely develop the automatic driving control software of the third terminal apparatus 14 by programming with the use of the disclosed API. Thus, the service providers can provide any mobility service by installing a facility according to a purpose in a space of the vehicle cabin of the vehicle 16 and developing automatic driving control software by programming with the use of an API according to the purpose.

Figure 4:
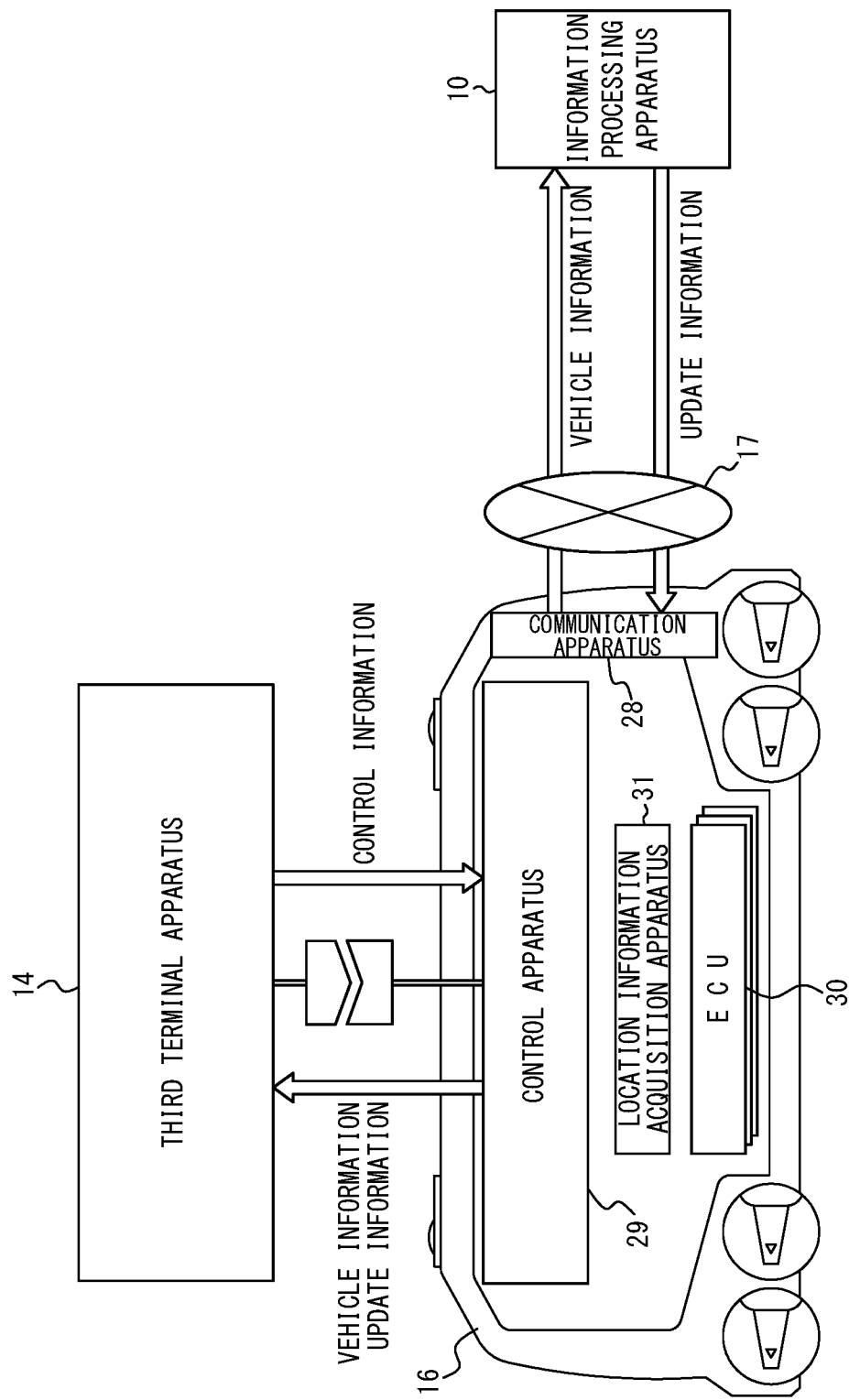
FIG. 4 is a functional block diagram schematically illustrating a configuration of a vehicle of FIG. 1.

As illustrated in FIG. 4, the vehicle 16 includes a communication apparatus 28, a control apparatus 29, a plurality of electronic control units (ECUs) 30, a location information acquisition apparatus 31, and the third terminal apparatus 14. The communication apparatus 28, the control apparatus 29, the ECUs 30, the location information acquisition apparatus 31, and the third terminal apparatus 14 are communicably connected to each other via, for example, an in-vehicle network such as a controller area network (CAN) or dedicated lines.

The communication apparatus 28 may be, for example, a dedicated on-board communication device. To connect to the network 17, the communication apparatus 28 may include a communication module compliant with mobile communication standards such as the fourth generation (4G) and the fifth generation (5G).

The control apparatus 29 performs vehicle control in accordance with control information received from the third terminal apparatus 14. For example, the vehicle control is, but not limited to, automated driving control for reaching a destination. The automated driving includes, for example, Levels 1 to 5 defined by the Society of Automotive Engineers (SAE), but the automated driving is not limited to this example and may be defined in any form. The vehicle control is performed by the control apparatus 29 and the ECUs 30 or the like cooperating with each other. The control apparatus 29 includes a communication module that communicates with the third terminal apparatus 14, the communication apparatus 28, and the ECUs 30, at least one memory that stores a system program, an application program, and the like, and a controller including at least one processor that controls the entire operation of the control apparatus 29.

The control apparatus 29 receives, for example, various kinds of vehicle information (for example, a speed, a location, and a condition of automated driving) regarding the vehicle 16 from the ECUs 30 or the like. The control apparatus 29 sends the vehicle information to the third terminal apparatus 14 and also to the information processing apparatus 10 by using the communication apparatus 28. The control apparatus 29 also receives update information for the system program and the like of the third terminal apparatus 14 from the information processing apparatus 10 via the communication apparatus 28 and sends the update information to the third terminal apparatus 14. When control information is received from the third terminal apparatus 14, the control apparatus 29 performs vehicle control for the vehicle 16 in accordance with the control information.

The ECUs 30 control an operation of the vehicle 16 in cooperation with the control apparatus 29. Specifically, the ECUs 30 receive from the control apparatus 29 a control instruction based on control information and control the operation of the vehicle 16 in accordance with the control instruction. For example, the ECUs 30 control the operating variable of the vehicle 16 to reach a value indicated by a control instruction. The ECUs 30 collect measured values regarding the control or operating variable of the vehicle 16 from various sensors installed in the vehicle 16 at each control time and sends the measured values to the control apparatus 29.

The location information acquisition apparatus 31 includes at least one receiver for a satellite navigation system. For example, the location information acquisition apparatus 31 may include a global positioning system (GPS) receiver. The location information acquisition apparatus 31 obtains a measured value corresponding to a location of the vehicle 16 as location information and sends the measured value to the control apparatus 29.

Figure 5:
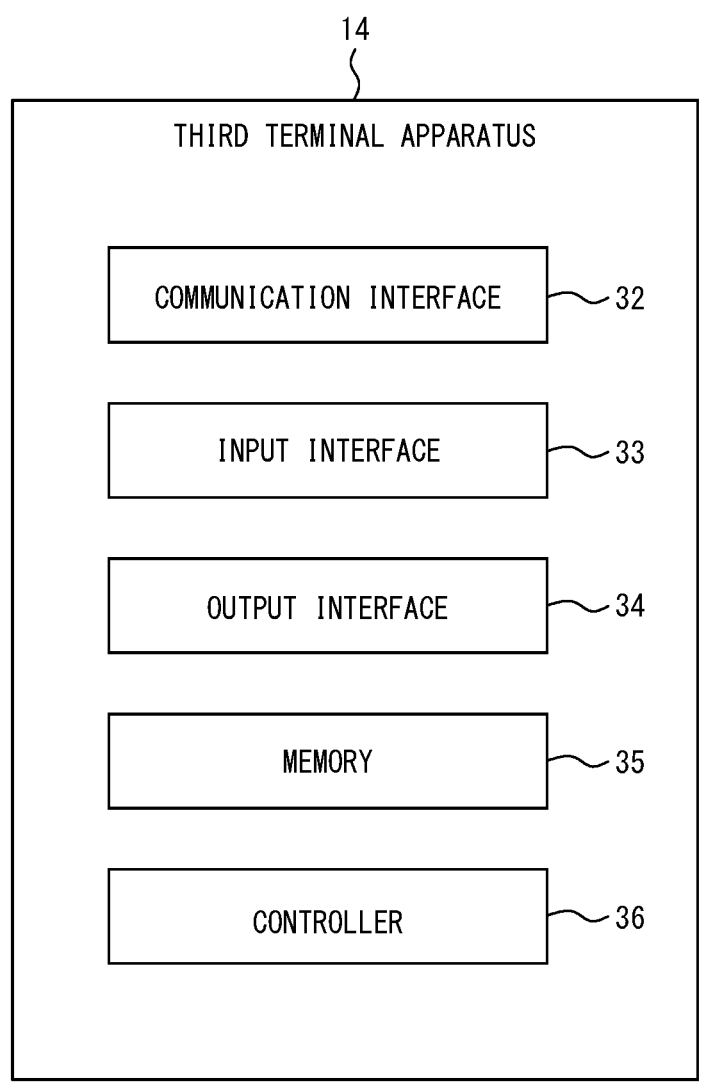
FIG. 5 is a functional block diagram schematically illustrating a configuration of a third terminal apparatus of FIG. 1.

As illustrated in FIG. 5, the third terminal apparatus 14 includes a communication interface 32, an input interface 33, an output interface 34, a memory 35, and a controller 36.

The communication interface 32 includes a communication module that communicates with the communication apparatus 28, the control apparatus 29, and the location information acquisition apparatus 31. In the present embodiment, the third terminal apparatus 14 is connected to the network 17 via the communication interface 32 and the communication apparatus 28. The communication interface 32 may include a communication module compliant with mobile communication standards such as the fourth generation (4G) and the fifth generation (5G) and may be connected directly to the network 17. The communication interface 32 sends and receives various kinds of information via at least the network 17.

The input interface 33 includes at least one interface that detects user inputs. For example, the input interface 33 is, but not limited to, physical keys, capacitive keys, a touch screen provided in combination with a display of the output interface 20, or a microphone that accepts sound input.

The output interface 34 includes at least one interface that outputs information to notify users. For example, the output interface 34 is, but not limited to, a display that outputs information as an image or a speaker that outputs information in sound.

The memory 35 is, but not limited to, a semiconductor memory, a magnetic memory, an optical memory, or the like. The memory 35 may function as, for example, a primary storage, an auxiliary storage, or a cache memory. The memory 35 stores any information that is used for an operation of the third terminal apparatus 14. The memory 35 may store, for example, a system program and an application program. The memory 35 may store identification information on the third terminal apparatus 14. The identification information on the third terminal apparatus 14 is information that can be used for uniquely identifying the third terminal apparatus 14 in the information processing system. The information stored in the memory 35 may be updated by using, for example, information received from the network 17 via the communication interface 32.

The controller 36 includes at least one processor. In the present embodiment, a "processor" is, but not limited to, a general processor or a processor especially for a particular processing operation. The controller 36 controls the entire operation of the third terminal apparatus 14.

When a pick-up route described later is received from the information processing apparatus 10, the controller 36 stores in the memory 35 authentication information contained in a pick-up route in association with every pick-up location.

The controller 36 reads out a departure area contained in the pick-up route. The controller 36 generates control information for moving the vehicle 16 to the departure area and controls the communication interface 32 to send the control information to the control apparatus 29. The departure area is, for example, a point at which parking is allowed and that is closest to a first pick-up location on the pick-up route or a parking space of the temporary child-care facility 15 in a surrounding area. When an operating instruction is received together with the pick-up route from the information processing apparatus 10, the controller 36 may, instead of generating control information, control the communication interface 32 to send part of the received operating instruction as control information to the control apparatus 29.

After arriving at a departure area, the controller 36 causes the vehicle 16 to wait until a departure time contained in the pick-up route. The controller 36 generates by the departure time control information for controlling the vehicle 16 to reach a facility location of the temporary child-care facility 15 via a pick-up location contained in the pick-up route. When the current time reaches the departure time, the controller 36 controls the communication interface 32 to send the generated control information to the control apparatus 29. When an operating instruction is received together with the pick-up route from the information processing apparatus 10, the controller 36 may, instead of generating control information, control the communication interface 32 to send part of the received operating instruction as control information to the control apparatus 29.

When the vehicle 16 arrives at a pick-up location, the controller 36 reads out from the memory 35 authentication information that is contained in the pick-up route and that is associated with the pick-up location. When authentication information on the second terminal apparatus 13 carried by a user with a child is recognized, the controller 36 compares the authentication information on the second terminal apparatus 13 with the authentication information read from the memory 35. The controller 36 can recognize the authentication information on the second terminal apparatus 13 such that the authentication information is received via the communication interface 32 with short-distance wireless communication or the input interface 33 detects the authentication information output in the form of, for example, image or sound from the output interface 25 of the second terminal apparatus 13.

When the authentication information read from the memory 35 is identical to the authentication information on the second terminal apparatus 13, the controller 36 allows the vehicle 16 to drop off the child. When the controller 36 allows drop-off by the vehicle 16, for example, the controller 36 sends control information for opening a door of the vehicle 16 to the control apparatus 29 via the communication interface 32. Additionally, when the controller 36 allows drop-off by the vehicle 16, for example, the controller 36 notifies a person accompanying the vehicle 16 of the drop-off permission by causing the output interface 34 to output the drop-off permission.

When a drop-off route described later is received from the information processing apparatus 10, the controller 36 stores in the memory 35 authentication information contained in a drop-off route in association with every drop-off location.

The controller 36 reads a facility location of the temporary child-care facility 15 as a departure point contained in the drop-off route. The controller 36 generates control information for causing the vehicle 16 to move to the facility location and controls the communication interface 32 to send the control information to the control apparatus 29. When an operating instruction is received together with the drop-off route from the information processing apparatus 10, the controller 36 may, instead of generating control information, control the communication interface 32 to send part of the received operating instruction as control information to the control apparatus 29.

After arriving at the facility location, the controller 36 causes the vehicle 16 to wait until a departure time contained in the drop-off route. The controller 36 generated by the departure time control information for controlling the vehicle 16 to reach a last drop-off location via each drop-off location contained in the drop-off route. When the current time reaches the departure time, the controller 36 controls the communication interface 32 to send the generated control information to the control apparatus 29. When an operating instruction is received together with the drop-off route from the information processing apparatus 10, the controller 36 may, instead of generating control information, control the communication interface 32 to send part of the received operating instruction as control information to the control apparatus 29.

When the vehicle 16 arrives at a drop-off location, the controller 36 reads out from the memory 35 authentication information that is contained in the drop-off route and that is associated with the drop-off location. When authentication information on the second terminal apparatus 13 carried by a user who came to drop-off his/her child is recognized, the controller 36 compares the authentication information on the second terminal apparatus 13 with the authentication information read from the memory 35.

When the authentication information read from the memory 35 is identical to the authentication information on the second terminal apparatus 13, the controller 36 allows handing the child to the user. When the controller 36 allows the handover, for example, the controller 36 sends control information for opening a door of the vehicle 16 to the control apparatus 29 via the communication interface 32. Additionally, when the controller 36 allows the handover, for example, the controller 36 notifies a person accompanying the vehicle 16 of the handover permission by causing the output interface 34 to output the handover permission.

Figure 6:
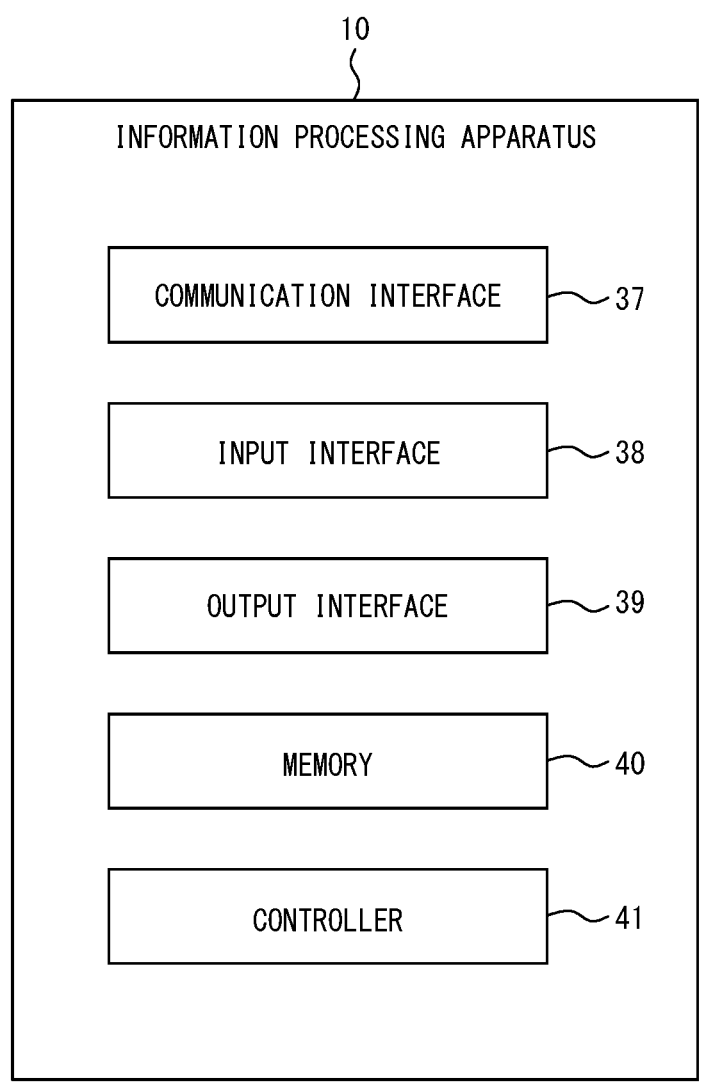
FIG. 6 is a functional block diagram schematically illustrating a configuration of the information processing apparatus of FIG. 1.

As illustrated in FIG. 6, the information processing apparatus 10 includes a communication interface 37, an input interface 38, an output interface 39, a memory 40, and a controller 41.

The communication interface 37 includes a communication module that establishes communication via a dedicated line. The communication interface 37 also includes a communication module that establishes connection with the network 17. For example, the communication interface 37 may include a communication module compliant with mobile communication standards such as the fourth generation (4G) and the fifth generation (5G). In the present embodiment, the information processing apparatus 10 is connected to the network 17 via the communication interface 37. The communication interface 37 sends and receives various kinds of information via the network 17.

The input interface 38 includes at least one interface that detects user inputs. For example, the input interface 38 is, but not limited to, physical keys, capacitive keys, a touch screen provided in combination with a display of the output interface 20, or a microphone that accepts sound input.

The output interface 39 includes at least one interface that outputs information to notify users. For example, the output interface 39 is, but not limited to, a display that outputs information as an image or a speaker that outputs information in sound.

The memory 40 is, but not limited to, a semiconductor memory, a magnetic memory, an optical memory, or the like. The memory 40 may function as, for example, a primary storage, an auxiliary storage, or a cache memory. The memory 40 stores any information that is used for an operation of the information processing apparatus 10. The memory 40 may store, for example, a system program and an application program.

The controller 41 includes at least one processor. In the present embodiment, a "processor" is, but not limited to, a general processor or a processor especially for a particular processing operation. The controller 41 controls the entire operation of the information processing apparatus 10.

When service specifications are received from the first terminal apparatus 12, the controller 41 registers the temporary child-care facility 15 by storing in the memory 40 identification information on the first terminal apparatus 12, a name of the temporary child-care facility 15, a facility location, a child-care start time, a child-care end time, holidays, and a capacity, which are contained in the service specifications, in an associated manner.

When the input interface 38 detects a user input for registering the vehicle 16, the controller 41 registers the vehicle 16 by storing in the memory 40 identification information on the communication apparatus 28 installed in the vehicle 16. The identification information on the communication apparatus 28 is information that can be used for uniquely identifying the communication apparatus 28 in the information processing system.

When a child-care request is received from the second terminal apparatus 13, the controller 41 stores the child-care request in the memory 40, that is, controls the memory 40 to store the child-care request. The controller 41 reads out from the memory 40 a capacity, a child-care start time, and a facility location of each of the temporary child-care facilities 15 at which the date of the pick-up time slot contained in the child-care request is not included in the holidays of the temporary child-care facilities 15. The controller 41 also reads out from the memory 40 a pick-up location and a pick-up time slot regarding a particular child who is associated with the particular temporary child-care facility 15 of information that is read. The particular child associated with the particular temporary child-care facility 15 is a child who is recorded in association with the particular temporary child-care facility 15 in an expedient manner because a child-care request regarding the child has been received at a previous time and it has been determined that the child-care service at the particular temporary child-care facility 15 and the transportation service by the vehicle 16 were able to be provided for the child.

The controller 41 determines whether a pick-up transportation can be provided for a new child-care request in accordance with the new child-care request, a capacity, a child-care start time, and a facility location of the temporary child-care facility 15 that has been read out, a pick-up location and a pick-up time slot of a child associated with each temporary child-care facility 15, and the number of the vehicles 16 that have been registered. The availability of pick-up transportation is determined in, for example, a manner specifically described below.

For example, the controller 41 assign, to each of the temporary child-care facilities 15, at least either one of a child of a new child-care request and a child who is read from the memory 40 within the capacity. The controller 41 assigns the different vehicles 16 to the individual temporary child-care facilities 15. The controller 41 allocates, with respect to each of the vehicles 16 assigned to the individual temporary child-care facilities 15, pick-up locations of children to whom a particular temporary child-care facility 15 is assigned and also an order of pick-up locations. The controller 41 generates a provisional route traveling via the allocated pick-up locations in order and reaching the facility location of the temporary child-care facility 15 as a destination point. When generating a provisional route, the controller 41 may allocate a plurality of temporary child-care facilities 15 to the provisional route and determine as pick-up locations the temporary child-care facilities 15 except one temporary child-care facility 15.

When an arrival time at the temporary child-care facility 15 in a provisional route is set at or after the child-care start time, the controller 41 determines whether an estimated arrival time at each pick-up location is within a pick-up time slot corresponding to the pick-up location. In the case in which not all estimated arrival times are within corresponding pick-up time slots of all pick-up locations in all provisional routes, the controller 41 regenerates a combination of provisional routes by changing one or any combination of an arrival time, an order of pick-up locations in a provisional route, a child to whom the vehicle 16 is assigned, the vehicle 16 assigned to the temporary child-care facility 15, and a child to whom the temporary child-care facility 15 is assigned. The controller 41 repeats generating a combination of provisional routes and comparing estimated arrival times of respective pick-up locations with corresponding pick-up time slots.

When it is impossible to generate a particular combination of provisional routes in which estimated arrival times at all pick-up locations are within corresponding pick-up time slots, the controller 41 determines that it is impossible to provide a pick-up transportation for a child of the new child-care request.

When it is possible to generate a particular combination of provisional routes in which estimated arrival times at all pick-up locations are within corresponding pick-up time slots, the controller 41 determines that it is possible to provide a pick-up transportation for a child of a new child-care request. The controller 41 determines the particular combination of provisional routes as a primary determined pick-up route. The controller 41 stores, with respect to each of the temporary child-care facilities 15 in the primary determined pick-up route, children to whom a particular temporary child-care facility 15 is assigned in association with the particular temporary child-care facility 15 in the memory 40.

The controller 41 may use an upper limit of travel time of a child when a primary determined pick-up route is determined. When a travel time of a first child who is handed to the vehicle 16 exceeds the upper limit, the controller 41 may exclude such a route in the determination of primary determined pick-up route. This means that the controller 41 may determine a primary determined pick-up route by using the upper limit of travel time of a child as a restriction.

When it is determined that a pick-up transportation can be provided for a child of a new child-care request, the controller 41 reads out from the memory 40 a child-care end time and a facility location of the temporary child-care facility 15 included in the primary determined pick-up route. The controller 41 reads out from the memory 40, with respect to each of the temporary child-care facilities 15 included in the primary determined pick-up route, pick-up locations and pick-up time slots of children to whom a particular temporary child-care facility 15 is assigned.

The controller 41 determines whether a drop-off transportation can be provided for a new child-care request in accordance with the new child-care request, a child-care end time and a facility location of each of the temporary child-care facilities 15 included in the primary determined pick-up route, a pickup location and a pickup time slot of each child to whom the corresponding temporary child-care facility 15 is assigned, and the number of the vehicles 16 that have been registered. The availability of drop-off transportation is determined in, for example, a manner specifically described below.

Specifically, for example, the controller 41 assigns the different vehicles 16 to the individual temporary child-care facilities 15. The controller 41 allocates, with respect to each of the vehicles 16 assigned to the individual temporary child-care facilities 15, drop-off locations of children to whom a particular temporary child-care facility 15 is assigned and also an order of drop-off locations. The controller 41 generates a provisional route traveling via the allocated drop-off locations in order and reaching the facility location of the temporary child-care facility 15 as a departure point. When generating a provisional route, the controller 41 may allocate a plurality of temporary child-care facilities 15 to the provisional route and determine, as the drop-of locations, the temporary child-care facilities 15 except one temporary child-care facility 15.

When a departure time from the temporary child-care facility 15 in a provisional route is set at or before the child-care end time, the controller 41 determines whether an estimated arrival time at each drop-off location is within a drop-off time slot corresponding to the drop-off location. In the case in which not all estimated arrival times are within corresponding drop-off time slots of all drop-off locations in all provisional routes, the controller 41 regenerates a combination of provisional routes by changing one or any combination of a departure time, an order of drop-off locations in a provisional route, a child to whom the vehicle 16 is assigned, and the vehicle 16 assigned to the temporary child-care facility 15. The controller 41 repeats generating a combination of provisional routes and comparing estimated arrival times of respective drop-off locations with corresponding pickup time slots.

When it is impossible to generate a particular combination of provisional routes in which estimated arrival times at all drop-off locations are within corresponding drop-off time slots, the controller 41 determines that it is impossible to provide a drop-off transportation for a child of the new child-care request.

When it is possible to generate a particular combination of provisional routes in which estimated arrival times at all drop-off locations are within corresponding drop-off time slots, the controller 41 determines that it is possible to provide a drop-off transportation for a child of the new child-care request. The controller 41 determines the particular combination of provisional routes as a primary determined drop-off route. The controller 41 stores, with respect to each of the temporary child-care facility 15 in the primary determined drop-off route, children to whom a particular temporary child-care facility 15 is assigned in association with the particular temporary child-care facility 15 in the memory 40.

The controller 41 may use an upper limit of travel time of a child when a primary determined drop-off route is determined. When a travel time of a child who gets off the vehicle 16 at the last drop-off location exceeds the upper limit, the controller 41 may exclude such a route in the determination of primary determined drop-off route. This means that the controller 41 may determine a primary determined drop-off route by using the upper limit of travel time of a child as a restriction.

When it is determined whether pick-up and drop-off transportations can be provided for a child of a new child-care request, the controller 41 controls the communication interface 37 to send the child-care availability condition to the second terminal apparatus 13 that has sent the new child-care request. The child-care availability condition indicates that a child-care service is available or unavailable. When pick-up and drop-off transportations can be provided for a child of a new child-care request, the controller 41 controls the communication interface 37 to send the child-care availability condition indicating that a child-care service is available. When either a pickup transportation or a drop-off transportation cannot be provided for a child of a new child-care request, the controller 41 controls the communication interface 37 to send the child-care availability condition indicating that a child-care service is unavailable.

The controller 41 generates pick-up and drop-off routes at a fixed confirmation time, for example, 10:00 p.m. one day before the day for which child-care is requested. The pick-up route is a confirmed route for navigating a vehicle to travel via pick-up locations within corresponding pick-up time slots and reach the facility location at or after the child-care start time of the temporary child-care facility 15. The drop-off route is a confirmed route departing from the facility location at or before the child-care end time of the temporary child-care facility 15 and traveling via drop-off locations within drop-off time slots.

The controller 41 reads out from the memory 40, for example, the temporary child-care facilities 15 included a primary determined pick-up route that is determined for a child-care request about which a child-care service can be provided at a time point closest to a confirmation time, a capacity, a child-care start time, and a facility location of each of the temporary child-care facilities 15, and a pick-up location and a pick-up time slot of an associated child. In accordance with the temporary child-care facilities 15, the capacity, the child-care start time, and the facility location of each of the temporary child-care facilities 15, and the pick-up location and the pick-up time slot of the associated child that have been read out, the controller 41 generates a combination of provisional routes similarly to the determination of the availability of pick-up transportation.

Similarly to the determination of the availability of pick-up transportation, the controller 41 generates various combinations of provisional routes by changing one or any combination of an arrival time, an order of pick-up locations in a provisional route, a child to whom the vehicle 16 is assigned, the vehicle 16 assigned to the temporary child-care facility 15, and a child to whom the temporary child-care facility 15 is assigned.

The controller 41 calculates a cost function for a combination of provisional routes in which estimated arrival times at all pick-up locations are within corresponding pick-up time slots with respect to every pick-up location in every provisional route. The cost function represents, for example, a travel distance or a travel time of the vehicle 16 with respect to all the provisional routes. The controller 41 determines a particular combination of provisional routes of which the calculated cost function is the smallest as drop-off routes of the vehicles 16 and stores the particular combination of provisional routes in the memory 40.

The controller 41 reads out from the memory 40, for example, the temporary child-care facilities 15 included a primary determined drop-off route that is determined for a child-care request about which a child-care service can be provided at a time point closest to a confirmation time, a child-care end time and a facility location of each of the temporary child-care facilities 15, and a drop-off location and a drop-off time slot for an associated child. In accordance with the temporary child-care facilities 15, the child-care end time and the facility location of each of the temporary child-care facilities 15, and the drop-off location and the drop-off time slot of the associated child that have been read out, the controller 41 generates a combination of provisional routes similarly to the determination of the availability of drop-off transportation.

Similarly to the determination of the availability of drop-off transportation, the controller 41 generates various combinations of provisional routes by changing one or any combination of an order of drop-off locations in a provisional route, a child to whom the vehicle 16 is assigned, and the vehicle 16 assigned to the temporary child-care facility 15.

The controller 41 calculates a cost function for a combination of provisional routes in which estimated arrival times at all pick-up locations are within corresponding pick-up time slots with respect to every pickup location in every provisional route. The cost function represents, for example, a travel distance or a travel time of the vehicle 16 with respect to all the provisional routes. The controller 41 determines a particular combination of provisional routes of which the calculated cost function is the smallest as drop-off routes of the vehicles 16 and stores the particular combination of provisional routes in the memory 40.

When generating a pick-up route, the controller 41 may determine a departure area in accordance with a first pick-up location. The controller 41 may include the determined departure area together with a departure time in a pick-up route.

The controller 41 generates authentication information for each pick-up location in the generated pick-up route. The controller 41 generates authentication information for each drop-off location in the generated drop-off route.

The controller 41 controls the communication interface 37 to send the generated pick-up route to the third terminal apparatus 14 installed in the vehicle 16 to which the route is allocated. The controller 41 may control the communication interface 37 to send to the third terminal apparatus 14 pieces of authentication information in association with corresponding pick-up locations in a pick-up route. The controller 41 may control the communication interface 37 to send the generated drop-off route to the third terminal apparatus 14 installed in the vehicle 16 to which the route is allocated. The controller 41 may control the communication interface 37 to send to the third terminal apparatus 14 pieces of authentication information in association with corresponding drop-off locations on a drop-off route.

In the case in which the vehicle 16 is an autonomous driving vehicle, the controller 41 may generate an operating instruction to drive along pick-up and drop-off routes and control the communication interface 37 to send the operating instruction together with the pick-up and drop-off routes to the third terminal apparatus 14 installed in the vehicle 16.

The controller 41 generates, in accordance with a pick-up route and a child-care request, a confirmed child-care reservation containing a name, a user name, a child-care time, and description of illness of each child to whom the temporary child-care facility 15 is assigned for the following day. The controller 41 may control the communication interface 37 to send the generated confirmed child-care reservation to the first terminal apparatus 12.

The controller 41 generates, in accordance with pick-up and drop-off routes, a confirmation report containing the temporary child-care facility 15 assigned to a particular child, contact information on the temporary child-care facility 15, a pick-up time, a drop-off time, and authentication information associated with the pick-up time and the drop-off time. The controller 41 controls the communication interface 37 to send the generated confirmation report to the second terminal apparatus 13 that has sent a child-care request of the particular child.

When a transfer request is received from one second terminal apparatus 13, the controller 41 controls the communication interface 37 to send a confirmation report that has been sent to the one second terminal apparatus 13, which has sent the transfer request, to another second terminal apparatus 13 as a transfer destination in accordance with identification information on the other second terminal apparatus 13 as a transfer destination contained in the transfer request.

In the case in which information on an infection condition of infectious disease for a region is received from an external organization such as a public health center, the controller 41 may determine, in accordance with the infection condition, the number of the vehicles 16 for which pick-up and drop-off routes are generated on an individual basis. The controller 41 may determine the number of the vehicles 16 in accordance with, for example, a correspondence table stored in the memory 40. The correspondence table may be generated by previously calculating the number of the vehicles 16 that are necessary according to the infection condition by performing, for example, machine learning or simulation and stored in the memory 40. The controller 41 causes the output interface 39 to output the determined number of the vehicles 16.

Figure 7:
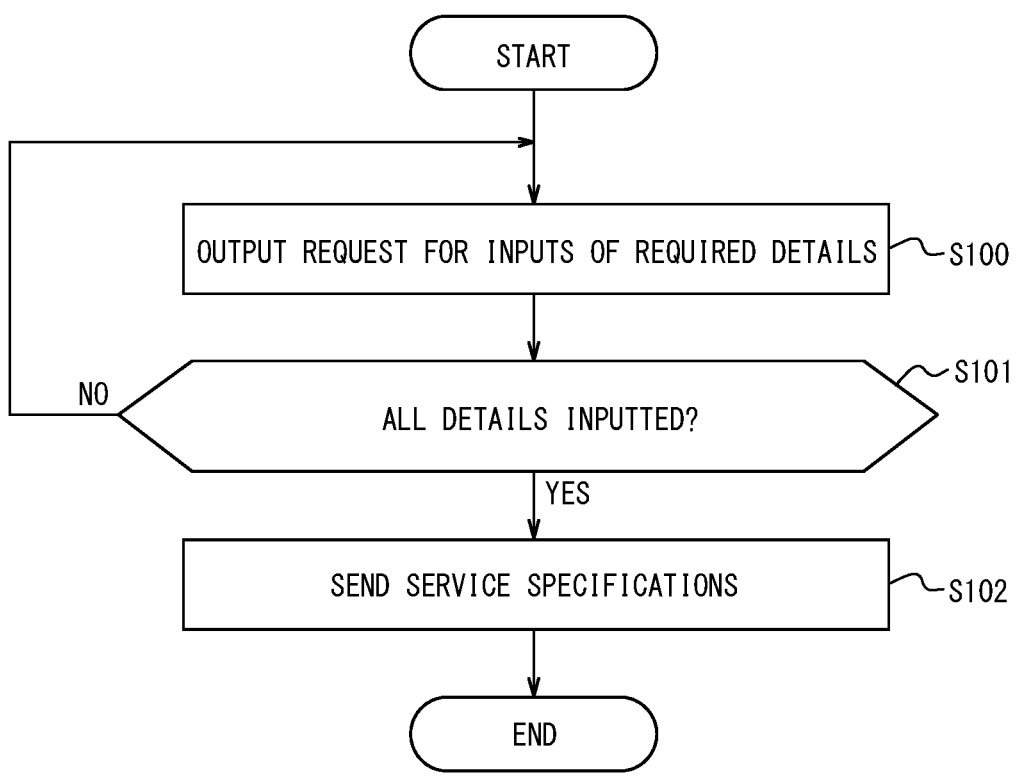
FIG. 7 is a flowchart illustrating facility registration request processing performed by a controller of FIG. 2.

Next, facility registration request processing performed by the controller 22 of the first terminal apparatus 12 in the present embodiment is described with reference to a flowchart in FIG. 7. The facility registration request processing is started when, for example, a user input for requesting registration of the temporary child-care facility 15 is detected.

In step S100, the controller 22 causes the output interface 20 to output a request for inputs of required details for the registration of the temporary child-care facility 15. After the request for inputs is output, the process proceeds to step S101.

In step S101, the controller 22 determines whether user inputs of all fields of the required details have been detected. In the case in which a user input of any of the required details has not been detected, the process returns to step S100. In the case in which all user inputs of the required details have been detected, the process proceeds to step S102.

In step S102, the controller 22 generates service specifications containing all the required details of the user inputs having been detected in step S101 and identification information on the first terminal apparatus 12. The controller 22 controls the communication interface 18 to send the generated service specifications to the information processing apparatus 10. After the generated service specifications are sent, the facility registration request processing is ended.

Figure 8:
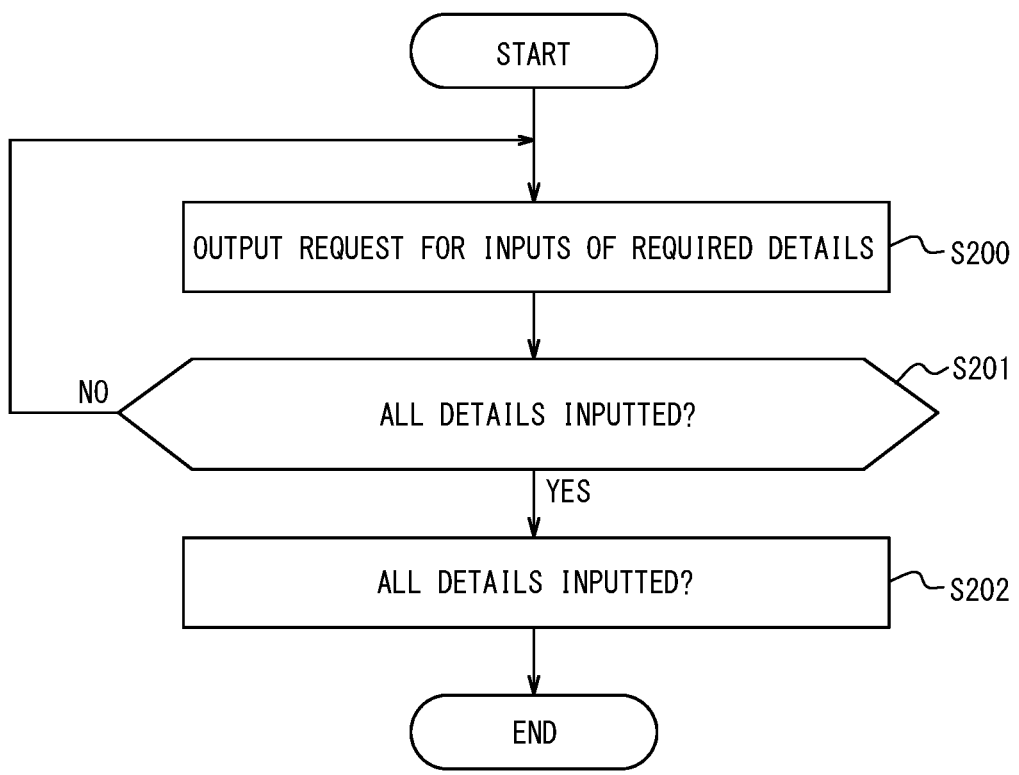
FIG. 8 is a flowchart illustrating child-care request processing performed by a controller of FIG. 3.

Next, child-care request processing performed by the controller 27 of the second terminal apparatus 13 in the present embodiment is described with reference to a flowchart in FIG. 8. The child-care request processing is started when, for example, a user input for requesting child-care is detected.

In step S200, the controller 27 causes the output interface 25 to output a request for inputs of required details for requesting child-care. After the request for inputs is output, the process proceeds to step S201.

In step S201, the controller 27 determines whether user inputs of all fields of the required details have been detected. In the case in which a user input of any of the required details has not been detected, the process returns to step S200. In the case in which all user inputs of the required details have been detected, the process proceeds to step S202.

In step S202, the controller 27 generates a child-care request containing all the required details of the user inputs having been detected in step S201 and identification information on the second terminal apparatus 13. The controller 27 controls the communication interface 23 to send the generated child-care request to the information processing apparatus 10. After the generated child-care request is sent, the child-care request processing is ended.

Figure 9:
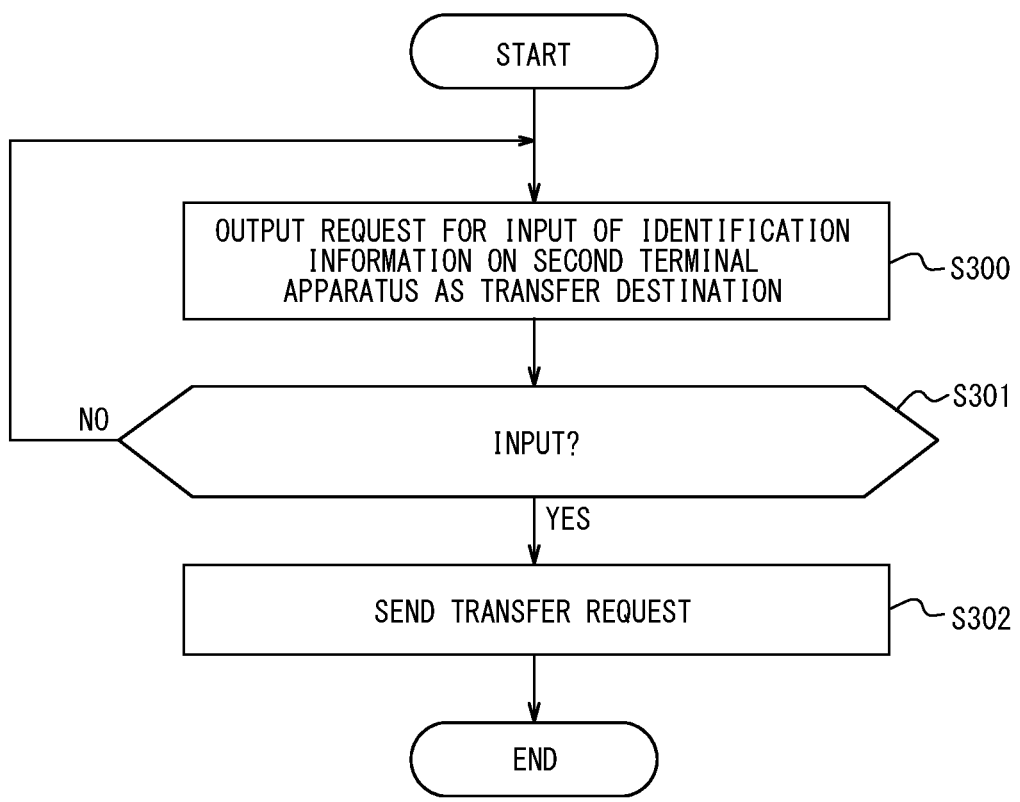
FIG. 9 is a flowchart illustrating transfer request processing performed by the controller of FIG. 3.

Next, transfer request processing performed by the controller 27 of the second terminal apparatus 13 in the present embodiment is described with reference to a flowchart in FIG. 9. The transfer request processing is started when, for example, a user input for requesting transfer is detected when or after a confirmation report is received.

In step S300, the controller 27 causes the output interface 25 to output a request for an input of identification information on another second terminal apparatus 13 as a transfer destination. After the request for an input is output, the process proceeds to step S301.

In step S301, the controller 27 determines whether a user input of identification information on the second terminal apparatus 13 as a transfer destination has been detected. In the case in which no user input has been detected, the process returns to step S300. In the case in which a user input has been detected, the process proceeds to step S302.

In step S302, the controller 27 generates a transfer request containing identification information on the second terminal apparatus 13 as a transfer destination of the user input having been detected in step S301. The controller 27 controls the communication interface 23 to send the generated transfer request to the information processing apparatus 10. After the generated transfer request is sent, the transfer request processing is ended.

Figure 10:
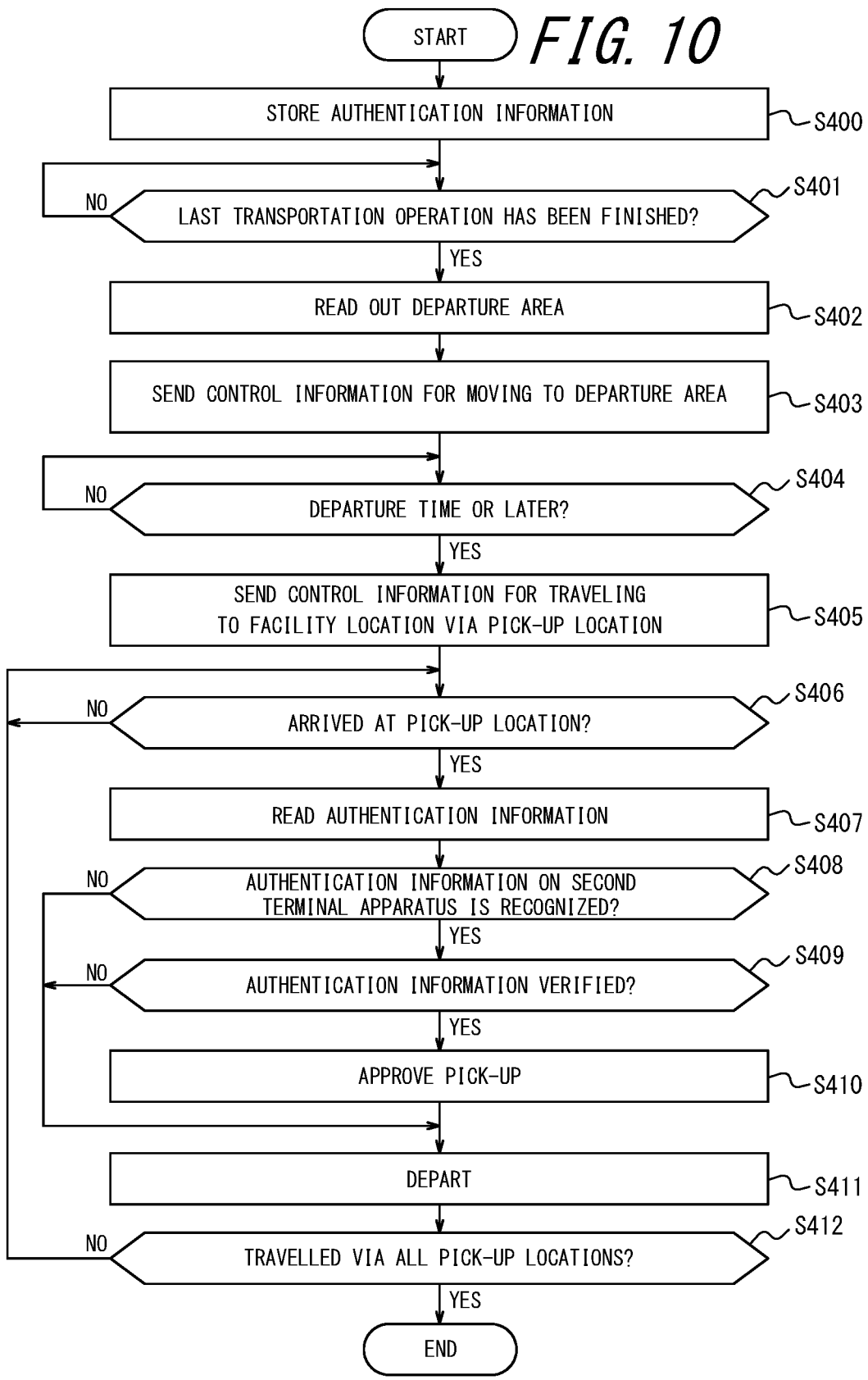
FIG. 10 is a flowchart illustrating pick-up transportation operating processing performed by a controller of FIG. 5.

Next, pick-up transportation operating processing performed by the controller 36 of the third terminal apparatus 14 in the present embodiment is described with reference to a flowchart in FIG. 10. The pick-up transportation operating processing is started when, for example, a pick-up route is received.

In step S400, the controller 36 stores in the memory 35 authentication information for each pick-up location included in the received pick-up route. After the information is stored, the process proceeds to step S401.

In step S401, the controller 36 determines whether the vehicle 16 has been completed a latest transportation operation that has been planned to be completed at or before the transportation operation time for traveling along the received pick-up route. In the case in which the latest transportation operation has not been completed, the process returns to step S401 and waits until the latest transportation operation is completed. In the case in which the latest transportation operation has been completed, the process proceeds to step S402.

In step S402, the controller 36 reads a departure area from the received pick-up route. After the departure area is read out, the process proceeds to step S403.

In step S403, the controller 36 generates control information for causing the vehicle 16 to move to the departure area read out in step S402. The controller 36 sends the generated control information to the control apparatus 29 to cause the vehicle 16 to move to the departure area. After the generated control information is sent, the process proceeds to step S404.

In step S404, the controller 36 determines whether the current time reaches the departure time contained in the received pick-up route or later. In the case in which the current time has not reached the departure time or later, the process returns to step S404 and the vehicle 16 is caused to wait until the current time reaches the departure time or later. In the case in which the current time has reached the departure time or later, the process proceeds to step S405.

In step S405, the controller 36 generates control information for causing the vehicle 16 to travel via the individual pick-up locations and reach the facility location. The controller 36 sends the generated control information to the control apparatus 29 to cause the vehicle 16 to start travelling along the pick-up route. After the generated control information is sent, the process proceeds to step S406.

In step S406, the controller 36 determines whether the vehicle 16 has arrived at a pick-up location included in the received pick-up route. The controller 36 uses, for example, the location of the vehicle 16 that is received from the location information acquisition apparatus 31 to determine the arrival of the vehicle 16 at a pick-up location. In the case in which the vehicle 16 has not arrived at a pick-up location, the process returns to step S406. In the case in which the vehicle 16 has arrived at a pick-up location, the process proceeds to step S407.

In step S407, the controller 36 causes the vehicle 16 to stop at a pick-up location. The controller 36 also reads out from the memory 35 authentication information associated with the pick-up location at which the vehicle 16 has arrived. After the authentication information is read out, the process proceeds to step S408.

In step S408, the controller 36 determines whether authentication information on the second terminal apparatus 13 is recognized at the pick-up location. In the case in which no authentication information is recognized, the process proceeds to step S411. In the case in which any authentication information is recognized, the process proceeds to step S409.

In step S409, the controller 36 determines whether the authentication information read in step S407 is identical to the authentication information on the second terminal apparatus 13 recognized in step S408. In the case in which both are not identical to each other, the process proceeds to step S411. In the case in which both are identical to each other, the process proceeds to step S410.

In step S410, the controller 36 allows the vehicle 16 to pick up a child. Depending on specifications of the vehicle 16, the controller 36 sends control information for opening a door of the vehicle 16 or outputs the pick-up permission. After pick-up is allowed, the process proceeds to step S411.

In step S411, the controller 36 sends to the control apparatus 29 control information for allowing the vehicle 16 to depart. After the control information is sent, the process proceeds to step S412.

In step S412, the controller 36 determines whether the vehicle 16 has traveled via all pick-up locations on the received pick-up route. In the case in which the vehicle 16 has not traveled via all the pick-up locations, the process returns to step S406. In the case in which the vehicle 16 has traveled via all the pick-up locations, the pick-up transportation operating processing is ended.

Figure 11:
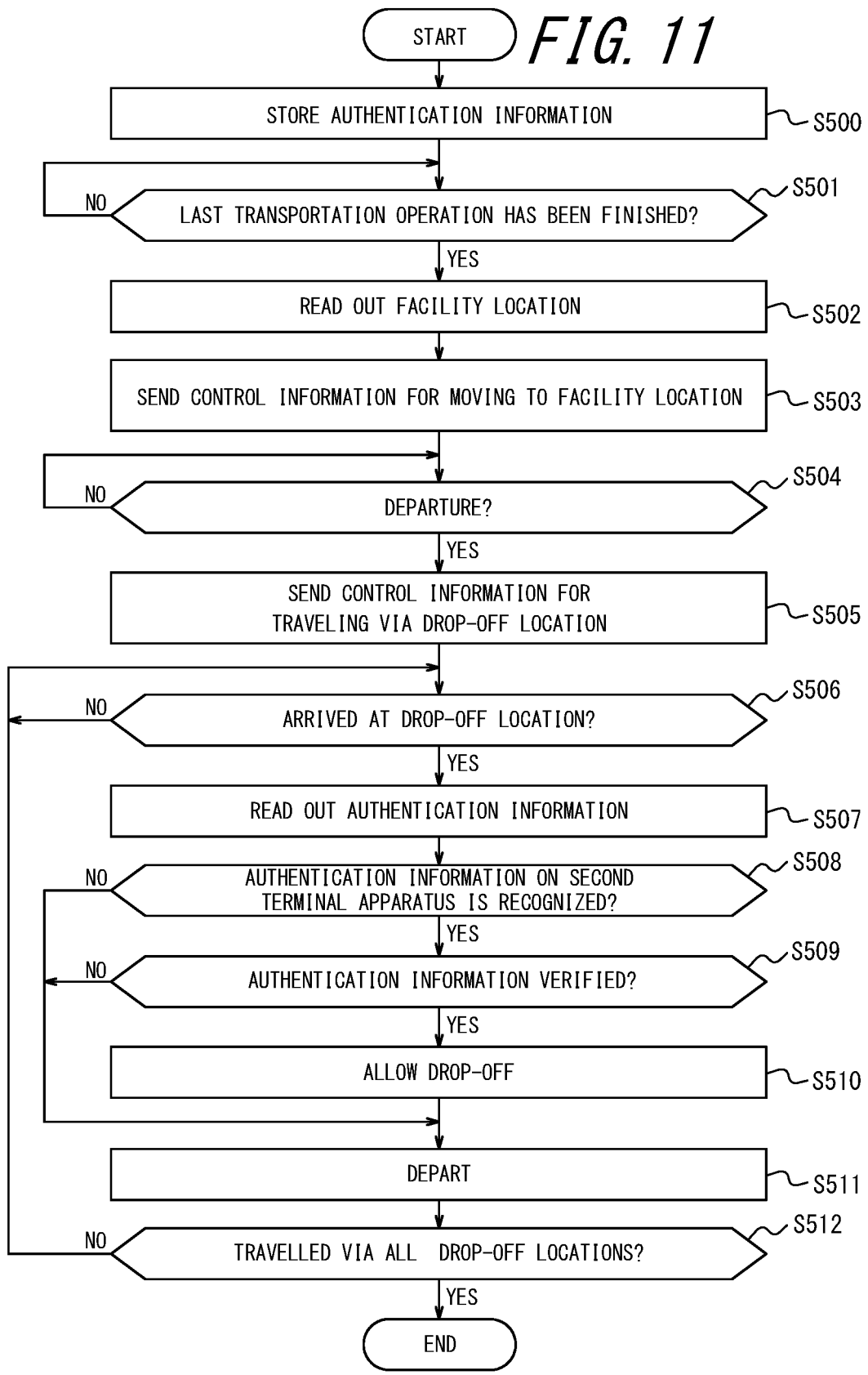
FIG. 11 is a flowchart illustrating drop-off transportation operating processing performed by the controller of FIG. 5.

Next, drop-off transportation operating processing performed by the controller 36 of the third terminal apparatus 14 in the present embodiment is described with reference to a flowchart in FIG. 11. The drop-off transportation operating processing is started when, for example, a drop-off route is received.

In step S500, the controller 36 stores in the memory 35 authentication information for each drop-off location on the received drop-off route. After the information is stored, the process proceeds to step S501.

In step S501, the controller 36 determines whether the vehicle 16 has been completed the last transportation operation that has been planned to be completed at or before the transportation operation time for traveling along the received drop-off route. In the case in which the last transportation operation has not been completed, the process returns to step S501 and waits until the last transportation operation is completed. In the case in which the last transportation operation has been completed, the process proceeds to step S502.

In step S502, the controller 36 reads a facility location of the temporary child-care facility 15 as a departure point from the received drop-off route. After the facility location is read out, the process proceeds to step S503.

In step S503, the controller 36 generates control information for causing the vehicle 16 to move to the facility location read in step S502. The controller 36 sends the generated control information to the control apparatus 29 to cause the vehicle 16 to move to the temporary child-care facility 15. After the control information is sent, the process proceeds to step S504.

In step S504, the controller 36 determines whether the current time reaches the departure time contained in the received drop-off route or later. In the case in which the current time has not reached the departure time or later, the process returns to step S504 and the vehicle 16 is caused to wait until the current time reaches the departure time or later. In the case in which the current time has reached the departure time or later, the process proceeds to step S505.

In step S505, the controller 36 generates control information for causing the vehicle 16 to travel via the individual drop-off locations and reach a last drop-off location. The controller 36 sends the generated control information to the control apparatus 29 to cause the vehicle 16 to start travelling along the drop-off route. After the control information is sent, the process proceeds to step S506.

In step S506, the controller 36 determines whether the vehicle 16 has arrived at a drop-off location on the received drop-off route. The controller 36 uses, for example, the location of the vehicle 16 that is received from the location information acquisition apparatus 31 to determine the arrival of the vehicle 16 at a drop-off location. In the case in which the vehicle 16 has not arrived at a drop-off location, the process returns to step S506. In the case in which the vehicle 16 has arrived at a drop-off location, the process proceeds to step S507.

In step S507, the controller 36 causes the vehicle 16 to stop at a drop-off location. The controller 36 also reads out, from the memory 35, authentication information associated with the drop-off location at which the vehicle 16 has arrived. After the authentication information is read out, the process proceeds to step S508.

In step S508, the controller 36 determines whether authentication information on the second terminal apparatus 13 is recognized at the drop-off location. In the case in which no authentication information is recognized, the process proceeds to step S511. In the case in which any authentication information is recognized, the process proceeds to step S509.

In step S509, the controller 36 determines whether the authentication information read out in step S507 is identical to the authentication information on the second terminal apparatus 13 recognized in step S508. In the case in which both are not identical to each other, the process proceeds to step S511. In the case in which both are identical to each other, the process proceeds to step S510.

In step S510, the controller 36 allows the vehicle 16 to drop off a child. Depending on specifications of the vehicle 16, the controller 36 sends control information for opening a door of the vehicle 16 or outputs the handover permission. After handover is allowed, the process proceeds to step S511.

In step S511, the controller 36 sends to the control apparatus 29 control information for allowing the vehicle 16 to depart. After the control information is sent, the process proceeds to step S512.

In step S512, the controller 36 determines whether the vehicle 16 has traveled via all the drop-off locations on the received drop-off route. In the case in which the vehicle 16 has not traveled via all the drop-off locations, the process returns to step S506. In the case in which the vehicle 16 has traveled via all the drop-off locations, the drop-off transportation operating processing is ended.

Figure 12:
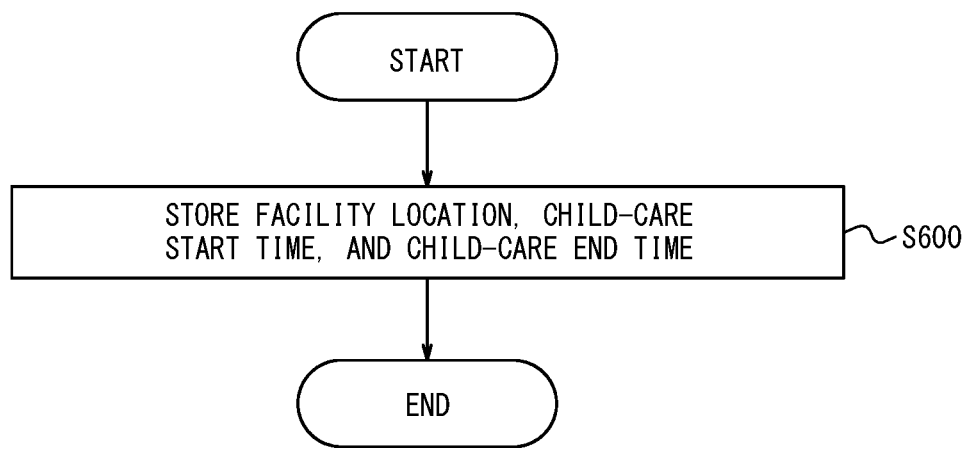
FIG. 12 is a flowchart illustrating facility registration processing performed by a controller of FIG. 6.

Next, facility registration processing performed by the controller 41 of the information processing apparatus 10 in the present embodiment is described with reference to a flowchart in FIG. 12. The facility registration processing is started when, for example, service specifications are received.

In step S600, the controller 41 stores in the memory 40 a facility location, a child-care start time, and a child-care end time that are contained in the received service specifications in association with the temporary child-care facility 15. After the information is stored, the facility registration processing is ended.

Figure 13:
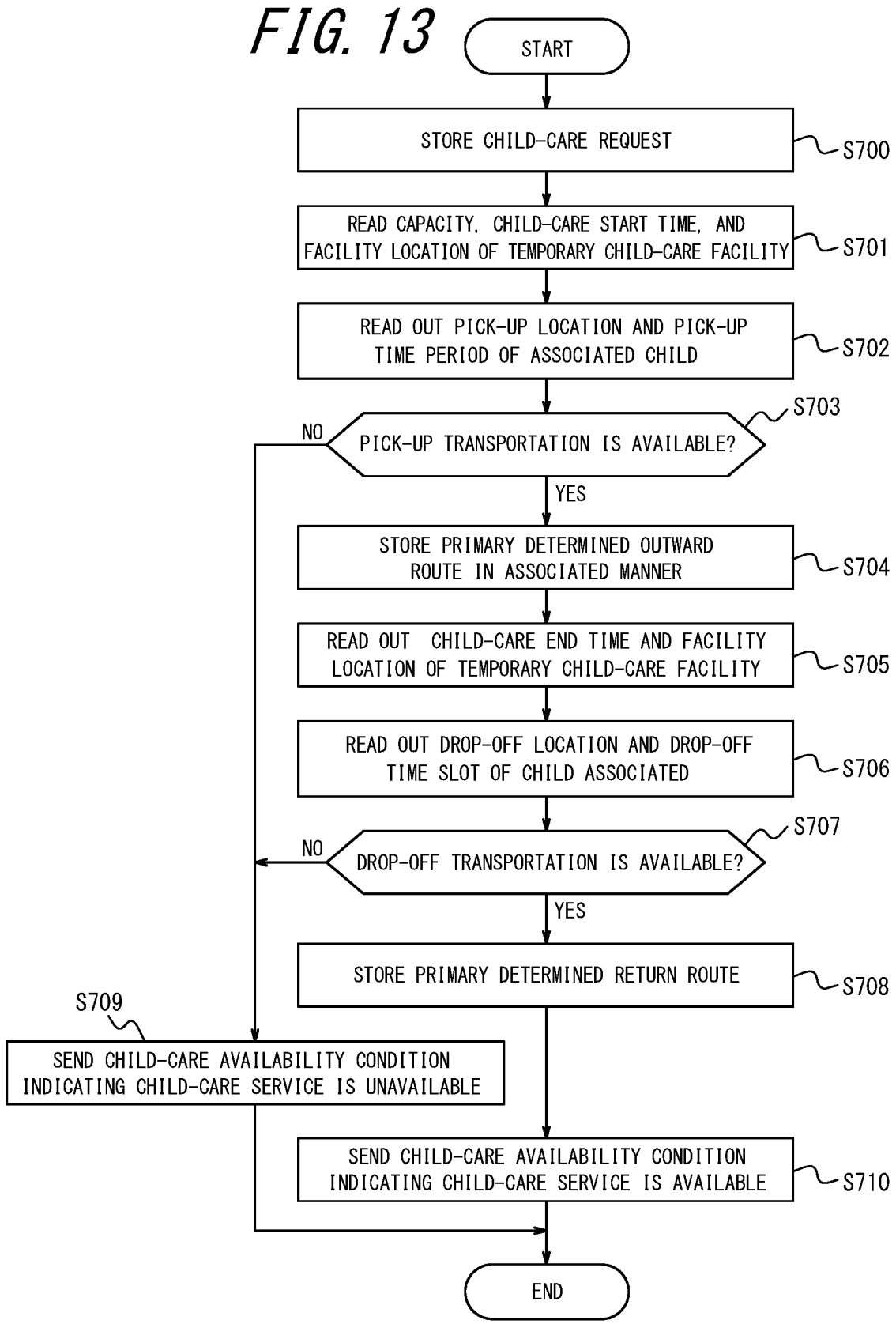
FIG. 13 is a flowchart illustrating child-care determination processing performed by the controller of FIG. 6.

Next, child-care determination processing performed by the controller 41 of the information processing apparatus 10 in the present embodiment is described with reference to a flowchart in FIG. 13. The child-care determination processing is started when, for example, a child-care request is received.

In step S700, the controller 41 stores the received child-care request in the memory 40. After the child-care request is stored, the process proceeds to step S701.

In step S701, the controller 41 reads out from the memory 40 a capacity, a child-care start time, and a facility location of each of the temporary child-care facilities 15 at which the date of the pick-up time slot contained in the child-care request stored in step S700 is not included in the holidays of the temporary child-care facilities 15. After the information is read out, the process proceeds to step S702.

In step S702, the controller 41 reads out from the memory 40 a pick-up location and a pick-up time slot regarding a particular child who is associated with the particular temporary child-care facility 15 of information that is read in step S701. After the information is read out, the process proceeds to step S703.

In step S703, the controller 41 determines whether a pick-up transportation can be provided in accordance with the received child-care request, the capacity, the child-care start time, and the facility location of the temporary child-care facility 15 that are read in step S701, and the pick-up location and the pick-up time slot of each child associated with the temporary child-care facility 15 that are read in step S702. In the case in which a pick-up transportation cannot be provided, the process proceeds to step S709. In the case in which a pick-up transportation can be provided, the process proceeds to step S704.

In step S704, the controller 41 stores in the memory 40 a combination of provisional routes, as a primary determined pick-up route, for which it is determined in step S703 that a pick-up transportation can be provided and also stores in the memory 40, in an associated manner, children to whom the temporary child-care facilities 15 included in the primary determined pick-up route are assigned. After the information is stored, the process proceeds to step S705.

In step S705, the controller 41 reads out from the memory 40 a child-care end time and a facility location of each of the temporary child-care facilities 15 allocated to the primary determined pick-up route stored in step S704. After the information is read out, the process proceeds to step S706.

In step S706, the controller 41 reads out from the memory 40 a drop-off location and a drop-off time slot of each child assigned to each of the temporary child-care facilities 15 of the child-care end time or the like that are read in step S705. After the information is read out, the process proceeds to step S707.

In step S707, the controller 41 determines whether a drop-off transportation can be provided in accordance with the received child-care request, the child-care end time and the facility location of the temporary child-care facility 15 that are read in step S705, and the drop-off location and the drop-off time slot of each child associated with the temporary child-care facility 15 that are read in step S706. In the case in which a drop-off transportation cannot be provided, the process proceeds to step S709. In the case in which a drop-off transportation can be provided, the process proceeds to step S708.

In step S708, the controller 41 stores in the memory 40 a combination of provisional routes, as a primary determined drop-off route, for which it is determined in step S707 that a drop-off transportation can be provided and also stores in the memory 40, in an associated manner, children to whom the temporary child-care facilities 15 included in the primary determined drop-off route are assigned. After the information is stored, the process proceeds to step S710.

In step S709, the controller 41 generates the child-care availability condition indicating that a child-care service is unavailable. The controller 41 controls the communication interface 37 to send the generated child-care availability condition to the second terminal apparatus 13 that has sent a child-care request. After the generated child-care availability condition is sent, the child-care determination processing is ended.

In step S710, the controller 41 generates the child-care availability condition indicating that a child-care service is available. The controller 41 controls the communication interface 37 to send the generated child-care availability condition to the second terminal apparatus 13 that has sent a child-care request. After the generated child-care availability condition is sent, the child-care determination processing is ended.

Figure 14:
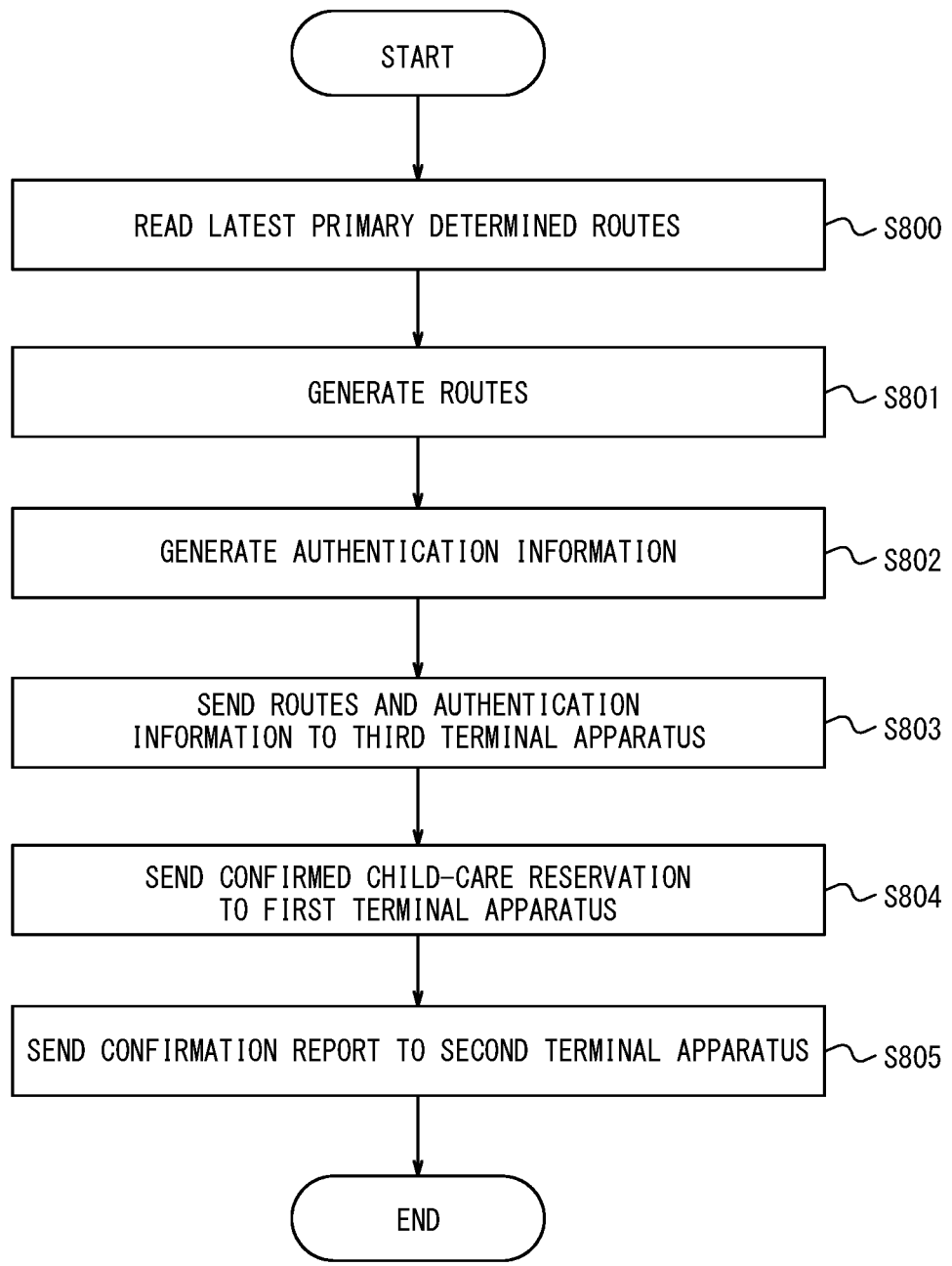
FIG. 14 is a flowchart illustrating route generation processing performed by the controller of FIG. 6.

Next, route generation processing performed by the controller 41 of the information processing apparatus 10 in the present embodiment is described with reference to a flowchart in FIG. 14. The route generation processing is started when, for example, a predetermined time is reached.

In step S800, the controller 41 reads out from the memory 40 a primary determined pick-up route and a primary determined drop-off route that have been determined with respect to a particular child-care request for which it has been determined, at a time point closest to a confirmation time, that a child-care service can be provided. The controller 41 also reads out from the memory 40, together with the primary determined routes, the temporary child-care facilities 15 included in the primary determined routes, a capacity, a child-care start time, a child-care end time, and a facility location of each of the temporary child-care facilities 15, and a pick-up location, a pick-up time slot, a pick-up location, and a pick-up time slot of each associated child. After the information is read out, the process proceeds to step S801.

In step S801, the controller 41 generates a combination of routes that minimizes the cost function in accordance with the primary determined pick-up route or the like that are read in step S800. The controller 41 determines a departure area and a departure time for each generated route. The controller 41 generates pick-up routes by including the determined departure area and the determined departure time in each corresponding route. The controller 41 generates a combination of routes that minimizes the cost function in accordance with the primary determined drop-off route or the like that are read in step S800. The controller 41 determines a departure time for each generated route. The controller 41 generates drop-off routes by including the determined departure time in each corresponding route. After the routes are generated, the process proceeds to step S802.

In step S802, the controller 41 generates authentication information for each pick-up location on each pick-up route generated in step S801. The controller 41 also generates authentication information for each drop-off location on each drop-off route generated in step S801. After the authentication information is generated, the process proceeds to step S803.

In step S803, the controller 41 controls the communication interface 37 to send the pick-up and drop-off routes that are generated in step S801 and the authentication information to the third terminal apparatus 14. After the information is sent, the process proceeds to step S804.

In step S804, the controller 41 generates, in accordance with the pick-up and drop-off routes that are generated in step S801, a confirmed child-care reservation in the form of list containing, with respect to each of the temporary child-care facilities 15, a name, a user name, a child-care time, and description of illness of each assigned child. The controller 41 controls the communication interface 37 to send the generated confirmed child-care reservation to the first terminal apparatuses 12 associated with the temporary child-care facilities 15. After the confirmed child-care reservation is sent, the process proceeds to step S805.

In step S805, the controller 41 generates, in accordance with the pick-up and drop-off routes that are generated in step S801 and the authentication information that is generated in step S802, a confirmation report containing an assigned temporary child-care facility 15, contact information, a pick-up time, a drop-off time, and authentication information on each child. The controller 41 controls the communication interface 37 to send the generated confirmation report to the second terminal apparatus 13 carried by a user of a corresponding child. After the confirmation report is sent, the route generation processing is ended.

Figure 15:
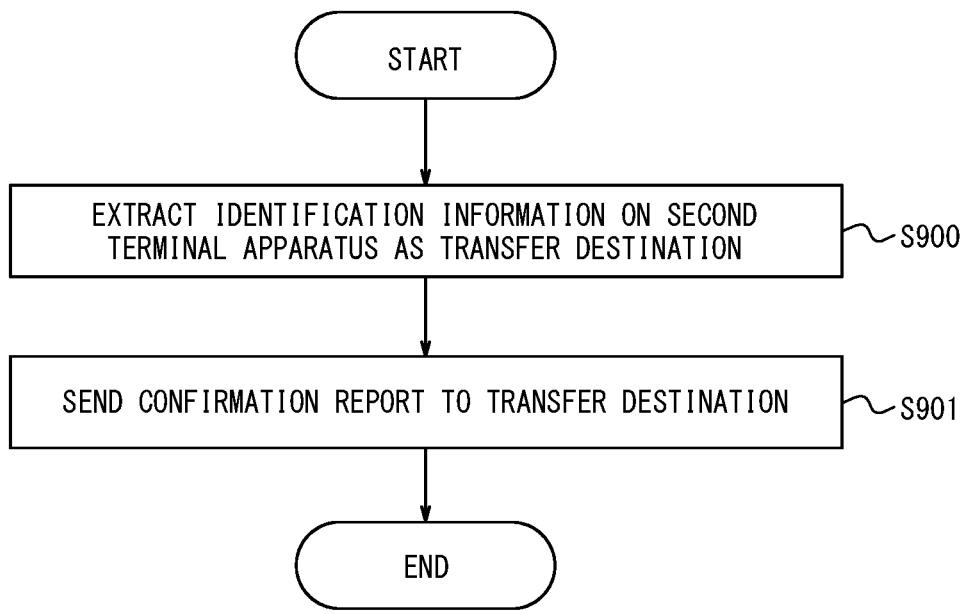
FIG. 15 is a flowchart illustrating transfer processing performed by the controller of FIG. 6.

Next, transfer processing performed by the controller 41 of the information processing apparatus 10 in the present embodiment is described with reference to a flowchart in FIG. 15. The transfer processing is started when, for example, a transfer request is received.

In step S900, the controller 41 extracts identification information on one second terminal apparatus 13 as a transfer destination from the received transfer request. The controller 41 reads out from the memory 40 authentication information included a confirmation report that has been sent to another second terminal apparatus 13 that is a sender of the transfer request. After the information is extracted, the process proceeds to step S901.

In step S901, the controller 41 controls the communication interface 37 to send, in accordance with the identification information extracted in step S900, to the second terminal apparatus 13 as a transfer destination the authentication information that is read in step S901. After the authentication information is sent, the transfer processing is ended.

Figure 16:
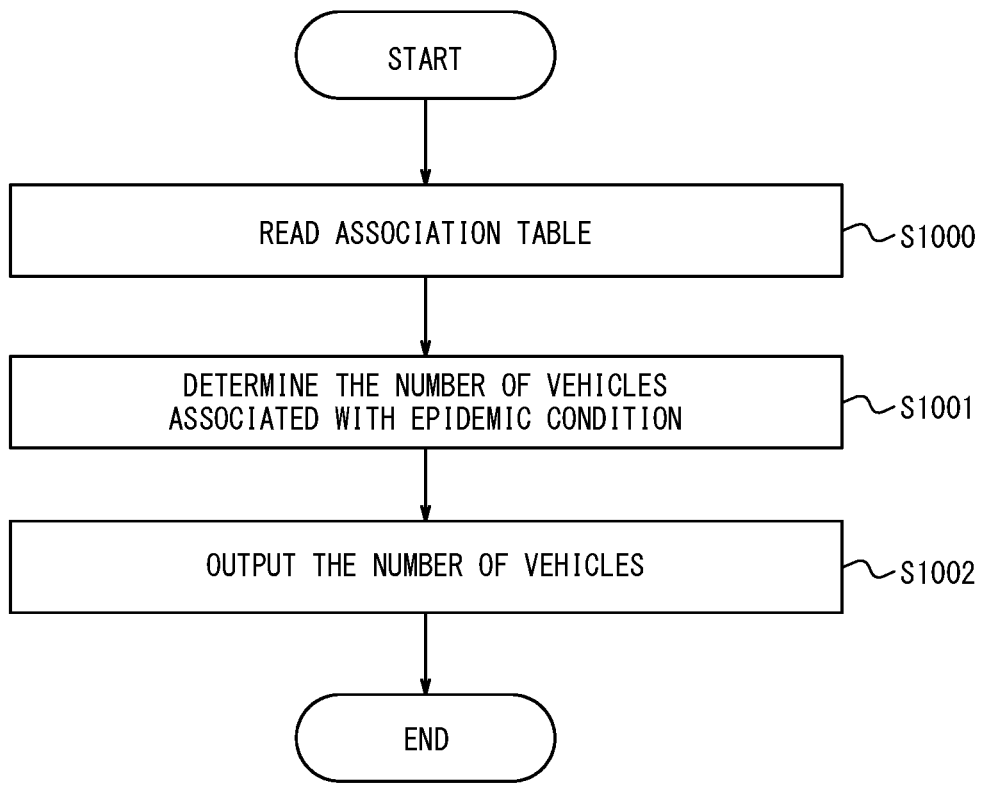
FIG. 16 is a flowchart illustrating vehicle count calculation processing performed by the controller of FIG. 6.

Next, vehicle count calculation processing performed by the controller 41 of the information processing apparatus 10 in the present embodiment is described with reference to a flowchart in FIG. 16. The vehicle count calculation processing is started when, for example, information on an infection condition is received.

In step S1000, the controller 41 reads a correspondence table regarding infection conditions from the memory 40. After the correspondence table is read out, the process proceeds to step S1001.

In step S1001, the controller 41 determines the number of the vehicles 16 corresponding to the received information on an infection condition in accordance with the correspondence table that is read in step S1000. After the number is determined, the process proceeds to step S1002.

In step S1002, the controller 41 controls the output interface 39 to output the number of the vehicles 16 determined in step S1001. After the number is output, the vehicle count calculation processing is ended.

The information processing apparatus 10 according to the present embodiment configured as described above stores the service specifications received from the first terminal apparatus 12 in association with the temporary child-care facility 15, stores the child-care request received from the second terminal apparatus 13 in association with a child, generates the pick-up route for navigating a vehicle to travel via a pick-up location of the child-care request within a pick-up time slot and reach a facility location at or after the child-care start time of the child-care facility 15, and sends, to the third terminal apparatus 14 installed in the vehicle 16, the pick-up route. With this configuration, travel by the vehicle 16 is used as a factor for managing place and time in the information processing apparatus 10, and as a result, the information processing apparatus 10 can ease constraints regarding place and time in matching between a user and the temporary child-care facility 15. Thus, the information processing apparatus 10 can allocate children in need of care to the temporary child-care facility 15 situated apart from densely populated areas such as areas close to stations, and consequently, it is possible to reduce barriers to establishing the temporary child-care facility 15 and contribute to increase of the temporary child-care facility 15. As such, the information processing apparatus 10 can improve the usability of the temporary child-care facility 15 for users.

Furthermore, the information processing apparatus 10 of the present embodiment sends, to the second terminal apparatus 13 and the third terminal apparatus 14, authentication information generated for the pick-up location in the pick-up route. With this configuration, the information processing apparatus 10 can hamper a person who does not submit a child-care request but attempts to pick-up his/her child in the vehicle 16, such that it is possible to reduce the possibility for misuse and the like.

Further, the information processing apparatus 10 of the present embodiment generates a drop-off route departing from the facility location at or before the child-care end time of the temporary child-care facility 15 and traveling via the drop-off location of the child-care request within the drop-off time slot and notifies the third terminal apparatus 14 of the drop-off route. With this configuration, the information processing apparatus 10 can ease constraints regarding place and time in matching between a user and the temporary child-care facility 15 not only when a child is left in the temporary child-care facility 15 but also when a child returns from the temporary child-care facility 15. As such, the information processing apparatus 10 can more improve the usability of the temporary child-care facility 15 for users.

Moreover, the information processing apparatus 10 of the present embodiment sends, to the second terminal apparatus 13 and the third terminal apparatus 14, authentication information generated for the drop-off location in the drop-off route. With this configuration, the information processing apparatus 10 can hamper a person who is not a user and who attempts to pick up a child, such that it is possible to reduce the possibility for kidnapping.

Furthermore, the information processing apparatus 10 of the present embodiment generates the pick-up and drop-off routes by using an upper limit of travel time of a child as a restriction. With this configuration, the information processing apparatus 10 can reduce the influence of travel by the vehicle 16 on children such as sick children.

Further, when a new child-care request is received, the information processing apparatus 10 of the present embodiment sends to the second terminal apparatus 13 a child-care availability condition at the temporary child-care facility 15 with use of the vehicle 16. With this configuration, the information processing apparatus 10 can notify a user who carries the second terminal apparatus 13 of at least the child-care availability condition for a child-care request before the confirmation time.

Moreover, the information processing apparatus 10 of the present embodiment determines the number of the vehicles 16 necessary according to an infection condition. With this configuration, the information processing apparatus 10 can cause a person in charge of the information processing apparatus 10 to realize the necessary number of the vehicles 16, and as a result, it is possible to urge the person in charge of the information processing apparatus 10 to temporarily secure the vehicle 16.

While the present disclosure has been described with reference to the accompanying drawings and the examples, it should be understood that various changes and modifications based on the present disclosure may be easily made by those skilled in the art. It should be noted that these changes and modifications are therefore embraced in the scope of the present disclosure. For example, the functions and the like included in the constituents, steps, and the like may be rearranged in a logically consistent manner; a plurality of constituents, steps, or the like may be combined together or divided.

For example, part of the processing operation performed by the information processing apparatus 10 in the embodiment described above may be carried out by at least any of the first terminal apparatus 12, the second terminal apparatus 13, and the third terminal apparatus 14. Part of the processing operation performed by at least any of the first terminal apparatus 12, the second terminal apparatus 13, and the third terminal apparatus 14 may be carried out by the information processing apparatus 10.

Furthermore, for example, a general electronic device such as a smartphone or a computer may be configured to function as the information processing apparatus 10 or the third terminal apparatus 14 according to the embodiment described above. Specifically, a program in which details of processing for implementing the function of, for example, the information processing apparatus 10 according to the embodiment are written is stored in a memory of an electronic device; a processor of the electronic device reads and runs the program. Thus, the disclosure according to the present embodiment may be implemented as a program that can be run by a processor. The program may be downloaded via a network 17; or the program may be stored in a portable non-transitory recording/storage medium readable by electronic devices and the program may be read from the medium by an electronic device.

Further, for example, while in the embodiment described above the example of the configuration in which the vehicle 16 is an autonomous driving vehicle is described, the vehicle 16 is not necessarily an autonomous driving vehicle. In the case in which the vehicle 16 is not an autonomous driving vehicle, received pick-up and drop-off routes may be output for a driver and driving following the routes may be assisted.

Moreover, for example, in the embodiment described above, when determining that pick-up and drop-off transportations can be provided, the information processing apparatus 10 sends to the second terminal apparatus 13 the child-care availability condition indicating that a child-care service is available; however, when determining that either a pick-up transportation or a drop-off transportation can be provided, the information processing apparatus 10 may send the child-care availability condition indicating that a child-care service is available.

The invention claimed is:

1. An autonomous vehicle control system that controls an autonomous vehicle, the control system comprising:
an information processing apparatus having a controller configured to
store service specifications that include a facility location, a child-care start time and a child-care end time, the service specifications being received from a first terminal apparatus, the service specifications being stored in a memory in association with a child care facility corresponding to the first terminal apparatus,
store in the memory a child-care request that includes a pick-up location of a child, a pick-up time slot of the child, a drop-off location of the child, and a drop-off time slot of the child, the child-care request being received from a second terminal apparatus,
determine whether the child-care request can be performed to deliver the child to the child-care facility at or after the child-care start time by picking-up the child at the pick-up location within the pick-up time slot, and to deliver the child to the drop-off location within the drop-off time slot by picking-up the child from the child-care facility location at or before the child-care end time,
when it has been determined that the child-care request can be performed, generate a pick-up route for navigating the autonomous vehicle to travel via the pick-up location within the pick-up time slot and reach the facility location at or after the child-care start time of the child-care facility, and generate a drop-off route departing from the facility location at or before the child-care end time of the child-care facility and traveling via the drop-off location within the drop-off time slot, and
send, to a third terminal apparatus installed in the autonomous vehicle, the pick-up route and the drop-off route; and
the autonomous vehicle having the third terminal apparatus, the autonomous vehicle further including one or more Electronic Control Units configured to control movement of the autonomous vehicle in response to control instructions that are based on control information received from the third terminal apparatus to cause the autonomous vehicle to travel along the pick-up route via the pick-up location within the pick-up time slot and reach the facility location at or after the child-care start time of the child-care facility and to cause the autonomous vehicle to travel along the drop-off route departing from the facility location at or before the child-care end time and travelling through the drop-off location within the drop-off time slot, wherein
the controller stores, in the memory, the service specifications for a plurality of different child care facilities,
when a new child-care request for a new child is received from the second terminal apparatus, the controller determines whether the new child-care request can be accepted by:
repeatedly generating different combinations of provisional pick-up routes by which children that have already been accepted at the plurality of different child care facilities and the new child are allocated to a plurality of the autonomous vehicles until a particular combination of the provisional pick-up routes results in all of the children that have already been accepted at the plurality of different child care facilities and the new child reaching the plurality of child care facilities at or after the child-care start time of the child care facilities by picking up all of the children that have already been accepted at the plurality of different child care facilities and the new child at their corresponding pick-up locations and pick-up time slots, and
repeatedly generating different combinations of provisional drop-off routes by which the children that have already been accepted at the plurality of different child care facilities and the new child are allocated to a plurality of the autonomous vehicles until a particular combination of the provisional drop-off routes results in all of the children that have already been accepted at the plurality of different child care facilities and the new child departing from the different child care facilities to which they have been assigned at or before the child-care end time of the child care facilities and being delivered to their corresponding drop-off locations within the corresponding drop-off time slots.

2. The autonomous vehicle control system according to claim 1, wherein
the controller sends, to the second terminal apparatus and the third terminal apparatus, authentication information generated for the pick-up location on the pick-up route.

3. The autonomous vehicle control system according to claim 1, wherein
the controller sends, to the second terminal apparatus and the third terminal apparatus, authentication information generated for the drop-off location on the drop-off route.

4. The autonomous vehicle control system according to claim 1, wherein
the controller generates the pick-up route so that a time period of travel by the autonomous vehicle between the pick-up location and the facility location is no longer than an upper limit of travel time that has been set for the child.

5. The autonomous vehicle control system according to claim 1, wherein
when the new child-care request is received from the second terminal apparatus, the controller sends, to the second terminal apparatus, a child-care availability condition that is a determination result indicating whether a child-care service at any of the plurality of different child-care facilities with use of the autonomous vehicle is available or unavailable.

6. The autonomous vehicle control system according to claim 1, further comprising:
the first terminal apparatus configured to send the service specifications to the information processing apparatus; and
the second terminal apparatus configured to send the child-care request to the information processing apparatus.

7. The autonomous vehicle control system according to claim 6, wherein
the controller of the information processing apparatus sends, to the second terminal apparatus and the third terminal apparatus, authentication information generated for the pick-up location on the pick-up route, and
when the authentication information recognized for the second terminal apparatus is identical to the authentication information received by the third terminal apparatus, the third terminal apparatus allows the autonomous vehicle to pick up the child.

8. An autonomous vehicle control method of controlling an autonomous vehicle, the method comprising:
receiving, by an information processing apparatus, service specifications that include a facility location, a child-care start time and a child-care end time from a first terminal apparatus;
the information processing apparatus storing the service specifications in association with a child-care facility corresponding to the first terminal apparatus in a memory;
receiving, by the information processing apparatus, a child-care request that includes a pick-up location of a child, a pick-up time slot of the child, a drop-off location of the child, and a drop-off time slot of the child from a second terminal apparatus;
the information processing apparatus storing the child-care request in the memory;
determining, by the information processing apparatus, whether the child-care request can be performed to deliver the child to the child-care facility at or after the child-care start time by picking-up the child at the pick-up location within the pick-up time slot, and to deliver the child to the drop-off location within the drop-off time slot by picking-up the child from the child-care facility location at or before the child-care end time;
when it has been determined by the information processing apparatus that the child-care request can be performed, generating, by the information processing apparatus, a pick-up route for navigating the autonomous vehicle to travel via the pick-up location of the child-care request within the pick-up time slot and reach the facility location at or after the child-care start time of the child-care facility, and generating a drop-off route departing from the facility location at or before the child-care end time of the child-care facility and traveling via the drop-off location within the drop-off time slot;
the information processing apparatus sending the pick-up route and the drop-off route to a third terminal apparatus installed in the autonomous vehicle; and
upon receipt of the pick-up route by the third terminal apparatus, one or more Electronic Control Units of the autonomous vehicle controlling movement of the autonomous vehicle in response to control instructions that are based on control information received from the third terminal apparatus to cause the autonomous vehicle to travel along the pick-up route via the pick-up location within the pick-up time slot and reach the facility location at or after the child-care start time of the child-care facility, and upon receipt of the drop-off route, one or more of the Electronic Control Units of the autonomous vehicle controlling movement of the autonomous vehicle in response to control instructions that are based on control information received from the third terminal apparatus to cause the autonomous vehicle to travel along the drop-off route departing from the facility location at or before the child-care end time and travelling through the drop-off location within the drop-off time slot, wherein
the memory stores the service specifications for a plurality of different child care facilities,
when a new child-care request for a new child is received from the second terminal apparatus, the information processing apparatus determines whether the new child-care request can be accepted by:
repeatedly generating different combinations of provisional pick-up routes by which children that have already been accepted at the plurality of different child care facilities and the new child are allocated to a plurality of the autonomous vehicles until a particular combination of the provisional pick-up routes results in all of the children that have already been accepted at the plurality of different child care facilities and the new child reaching the plurality of child care facilities at or after the child-care start time of the child care facilities by picking up all of the children that have already been accepted at the plurality of different child care facilities and the new child at their corresponding pick-up locations and pick-up time slots, and
repeatedly generating different combinations of provisional drop-off routes by which the children that have already been accepted at the plurality of different child care facilities and the new child are allocated to a plurality of the autonomous vehicles until a particular combination of the provisional drop-off routes results in all of the children that have already been accepted at the plurality of different child care facilities and the new child departing from the different child care facilities to which they have been assigned at or before the child-care end time of the child care facilities and being delivered to their corresponding drop-off locations within the corresponding drop-off time slots.

9. The autonomous vehicle control method according to claim 8, further comprising:
the information processing apparatus sending, to the second terminal apparatus and the third terminal apparatus, authentication information generated for the pick-up location on the pick-up route.

10. The autonomous vehicle control method according to claim 8, further comprising:
the information processing apparatus sending, to the second terminal apparatus and the third terminal apparatus, authentication information generated for the drop-off location on the drop-off route.

11. The autonomous vehicle control method according to claim 8, further comprising:
the information processing apparatus generating the pick-up route so that a time period of travel by the autonomous vehicle between the pick-up location and the facility location is no longer than an upper limit of travel time that has been set for the child.

12. The autonomous vehicle control method according to claim 8, further comprising:
when the new child-care request is received from the second terminal apparatus, the information processing apparatus sending, to the second terminal apparatus, a child-care availability condition that is a determination result indicating whether a child-care service at any of the plurality of different child-care facilities with use of the autonomous vehicle is available or unavailable.

* * * * *